(12) United States Patent
Chang et al.

(10) Patent No.: US 11,140,646 B2
(45) Date of Patent: Oct. 5, 2021

(54) METHOD AND APPARATUS FOR TRANSMITTING AND RECEIVING SYNCHRONIZING SIGNAL IN A COMMUNICATION SYSTEM

(71) Applicant: Electronics and Telecommunications Research Institute, Daejeon (KR)

(72) Inventors: Kap Seok Chang, Daejeon (KR); Young Jo Ko, Daejeon (KR); Yong Sun Kim, Suwon-si (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/884,498

(22) Filed: May 27, 2020

(65) Prior Publication Data

US 2020/0383074 A1    Dec. 3, 2020

(30) Foreign Application Priority Data

May 27, 2019   (KR) .......................... 10-2019-0061992
May 26, 2020   (KR) .......................... 10-2020-0063262

(51) Int. Cl.
*H04W 56/00*           (2009.01)

(52) U.S. Cl.
CPC ..... *H04W 56/004* (2013.01); *H04W 56/0035* (2013.01)

(58) Field of Classification Search
CPC ........... H04W 56/004; H04W 56/0035; H04W 56/0005; H04W 72/04; H04L 27/2662;

(Continued)

(56) References Cited

U.S. PATENT DOCUMENTS

| 6,324,159 B1 * | 11/2001 | Mennekens | ............ | H04B 1/707 370/203 |
| 7,796,694 B1 * | 9/2010 | O'Connor | ............... | H04J 13/10 375/242 |

(Continued)

FOREIGN PATENT DOCUMENTS

WO    2018164414 A1    9/2018

*Primary Examiner* — Jung Liu
(74) *Attorney, Agent, or Firm* — William Park & Associates Ltd.

(57) ABSTRACT

Disclosed are a method and an apparatus for transmitting and receiving a synchronization signal in a communication system. According to an exemplary embodiment of the present disclosure, a method of transmitting a first synchronization signal, performed by a base station in the communication system, may comprise generating a base sequence; generating a modified sequence by inverting polarity of the base sequence; mapping the base sequence and the modified sequence to a first frequency region having a frequency higher than a center subcarrier and a second frequency region having a frequency lower the center subcarrier, so that the base sequence and the modified sequence are symmetric centering the center subcarrier located at a center frequency of a frequency domain of the synchronization signal; and transmitting the synchronization signal comprising the base sequence and the modified sequence to a terminal. Therefore, performance of the communication system can be improved.

19 Claims, 17 Drawing Sheets

(58) Field of Classification Search
CPC . H04L 5/0053; H04L 5/0007; H04L 27/2636; H04L 27/2646; H04L 27/2666; H04L 27/2698; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | |
|---|---|---|---|
| 7,924,808 | B2 | 4/2011 | Han et al. |
| 2010/0296429 | A1* | 11/2010 | Han .................. H04L 12/189 370/312 |
| 2013/0022017 | A1 | 1/2013 | Han et al. |
| 2013/0259013 | A1 | 10/2013 | Malladi et al. |
| 2015/0263875 | A1 | 9/2015 | Chang et al. |
| 2016/0242131 | A1* | 8/2016 | Popovic .............. H04J 13/0074 |
| 2016/0337105 | A1* | 11/2016 | Lawton ................. H04L 1/0026 |
| 2017/0245278 | A1* | 8/2017 | Xue ................... H04L 27/2602 |
| 2017/0288848 | A1* | 10/2017 | Lei ..................... H04L 27/2656 |
| 2017/0325260 | A1* | 11/2017 | Guo ................... H04W 72/0453 |
| 2017/0373812 | A1* | 12/2017 | Berggren ............ H04W 56/001 |
| 2018/0041976 | A1 | 2/2018 | Chang et al. |
| 2018/0212812 | A1* | 7/2018 | Wang ................. H04L 27/2662 |
| 2018/0262313 | A1* | 9/2018 | Nam ..................... H04L 5/005 |
| 2018/0278314 | A1* | 9/2018 | Nam ................... H04B 7/0413 |
| 2018/0295007 | A1* | 10/2018 | Kumar ............... H04L 27/2613 |
| 2018/0317207 | A1* | 11/2018 | Liao ................... H04L 5/0094 |
| 2018/0324678 | A1* | 11/2018 | Chen ................... H04W 8/08 |
| 2019/0097856 | A1 | 3/2019 | Kim et al. |
| 2020/0163052 | A1* | 5/2020 | Ko ..................... H04J 11/0069 |
| 2021/0007065 | A1* | 1/2021 | Ko ....................... H04L 5/0051 |

* cited by examiner

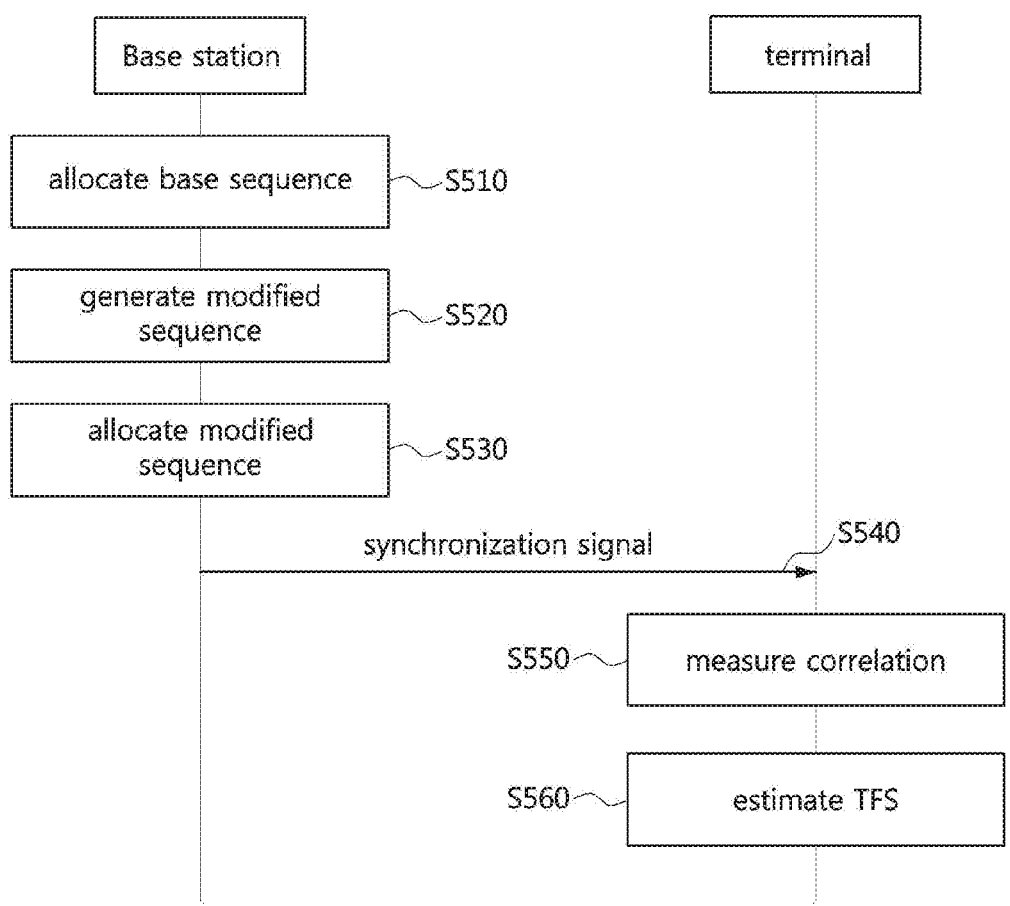

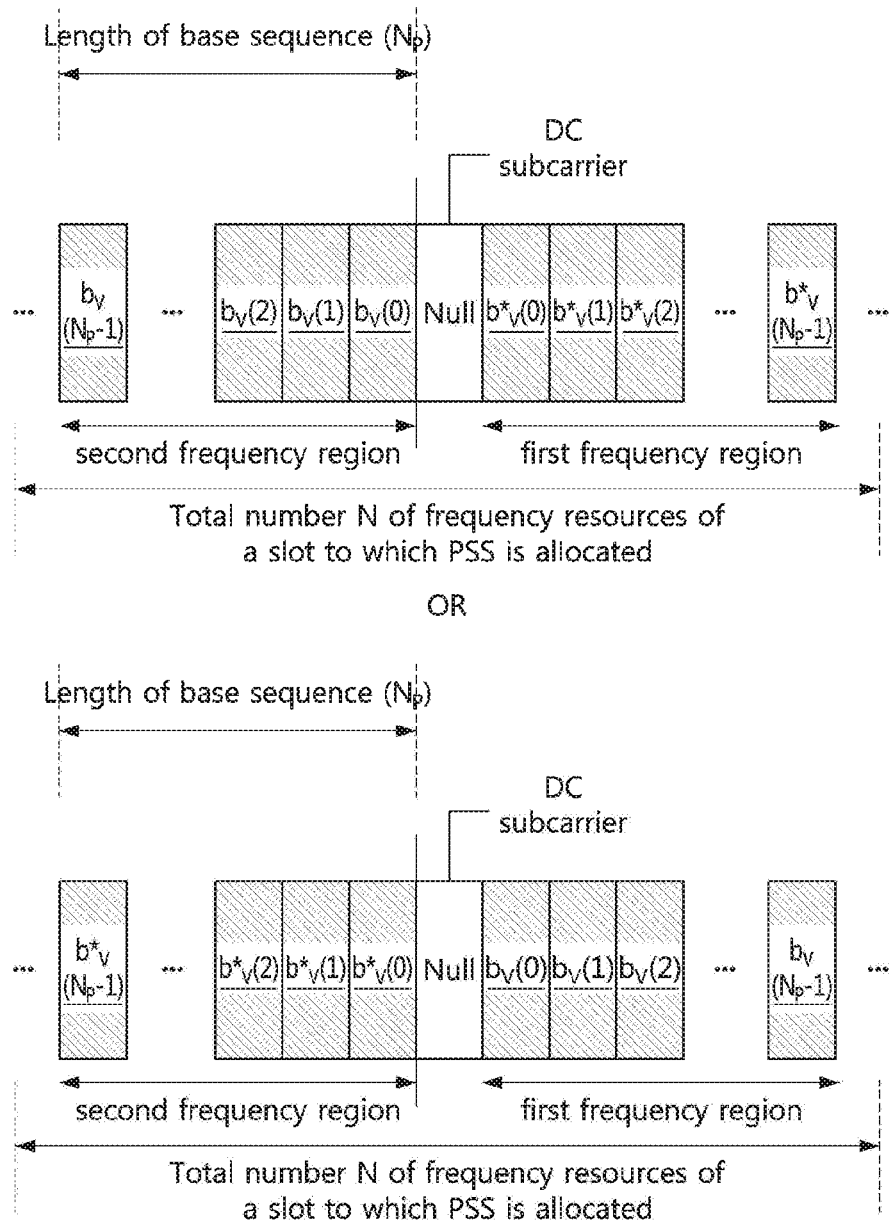

METHOD AND APPARATUS FOR TRANSMITTING AND RECEIVING SYNCHRONIZING SIGNAL IN A COMMUNICATION SYSTEM

CROSS-REFERENCE TO RELATED APPLICATIONS

This application claims priority to Korean Patent Applications No. 10-2019-0061992 filed on May 27, 2019, and No. 10-2020-0063262 filed on May 26, 2020 with the Korean Intellectual Property Office (KIPO), the entire contents of which are hereby incorporated by reference.

BACKGROUND

1. Technical Field

The present disclosure relates to a technique for transmitting and receiving a synchronization signal in a wireless communication system, and more specifically, to a method and an apparatus of transmitting and receiving a synchronization signal for efficient estimation of synchronization in a situation where a frequency offset exists or a terminal moves fast.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In order to process soaring wireless data after commercialization of the 4G communication system (e.g., communication system supporting the LTE), the 5G communication system (e.g., communication system supporting the NR) using a frequency band (e.g., frequency band of 6 GHz or above) higher than a frequency band (e.g., frequency band of 6 GHz or below) of the 4G communication system as well as the frequency band of the 4G communication system is being considered.

In the 4G or 5G communication system, a terminal can access a base station and search for a cell in a network to perform communication. In this process, a primary synchronization signal (PSS) and a secondary synchronization signal (SSS) may be used. The PSS may be used for time/frequency synchronization (TFS) estimation, or the like. The SSS may be used for physical cell identity (PCI) estimation, or the like.

Meanwhile, when inter-channel interference (ICI) occurs in a synchronization signal received by the terminal, estimation or search performance of the terminal may deteriorate. For example, the ICI may occur when a carrier frequency offset (CFO), which is an error between a frequency of a transmission signal of the base station and a frequency of a reception signal of the terminal, is high. Alternatively, when the terminal moves at a high speed, the ICI may occur. As described above, in the synchronization estimation method based on the conventional synchronization signal, there is a problem in that the synchronization estimation performance of the terminal is deteriorated when the CFO is large or the moving speed of the terminal is high.

SUMMARY

According to a first exemplary embodiment of the present disclosure for achieving the above-described objective, a method of transmitting a synchronization signal, performed by a base station in a communication system, may comprise generating a base sequence; generating a modified sequence by inverting polarity of the base sequence; mapping the base sequence and the modified sequence to a first frequency region having a frequency higher than a center subcarrier and a second frequency region having a frequency lower the center subcarrier, so that the base sequence and the modified sequence are symmetric centering the center subcarrier located at a center frequency of a frequency domain of the synchronization signal; and transmitting the synchronization signal comprising the base sequence and the modified sequence to a terminal.

The base sequence may be a complex sequence, and in the generating of the modified sequence, the modified sequence may be generated by inverting polarity of at least one of real parts and imaginary parts of the base sequence.

The base sequence may be a binary sequence, and in the generating of the modified sequence, the modified sequence may be generated by inverting polarity of real parts of the base sequence.

The synchronization signal may be a primary synchronization signal (PSS), the PSS is generated based on a first optimal sequence set, and the first optimal sequence set may be generated by generating a plurality of candidate sequence sets based on an accumulated auto-correlation value for an effective time synchronization range for each of a plurality of sequences constituting the base sequence, and selecting the first optimal sequence set based on an effective cross-correlation value between sequences constituting each of the candidate sequence sets among the plurality of candidate sequence sets.

According to a second exemplary embodiment of the present disclosure for achieving the above-described objective, a method of transmitting a synchronization signal, performed by a base station in a communication system, may comprise generating a first sequence and a second sequence which are different from each other; generating a third sequence by performing an element-wise exclusive-OR operation between the first sequence and the second sequence; generating a synchronization signal based on the third sequence; mapping the generated synchronization signal to a frequency domain; and transmitting the generated synchronization signal to a terminal.

The generating of the first sequence and the second sequence may comprise generating a first binary sequence and a second binary sequence which are different from each other; generating the first sequence by applying a first shift index to the first binary sequence; and generating the second sequence by applying a second shift index to the second binary sequence.

A first scaling factor and a second scaling factor, which are different from each other, may be applied to the first shift index and the second shift index, respectively.

The synchronization signal may be a secondary synchronization signal (SSS), and the first and second shift indices may be generated based on a physical cell ID (PCI) index of the base station.

The generating of the third sequence may comprise setting a value at an n-th position of the third sequence to 1 when a value at the n-th position of the first sequence is different from a value at the n-th position of the second sequence; and setting the value at the n-th position of the third sequence to 0 when the value at the n-th position of the first sequence is equal to the value at the n-th position of the second sequence.

The generating of the synchronization signal based on the third sequence may comprise performing a binary phase shift keying (BPSK) modulation on the third sequence.

The performing of the BPSK modulation may comprise setting a value at an n-th position of the synchronization signal based on the third sequence to a first setting value when a value at the n-th position of the third sequence is 0; and setting the value at the n-th position of the synchronization signal based on the third sequence to a second setting value when the value at the n-th position of the third sequence is 1, wherein the second setting value is set to −1 when the first setting value is set to 1, and the second setting value is set to 1 when the first setting value is set to −1.

According to a third exemplary embodiment of the present disclosure for achieving the above-described objective, a base station for transmitting a first synchronization signal and a second synchronization signal, for synchronization estimation at a terminal, to the terminal in a communication system, may comprise a processor; a memory electronically communicating with the processor; and instructions stored in the memory, wherein when executed by the processor, the instructions cause the base station to generate a base sequence for generation of the first synchronization signal; generate a modified sequence by inverting polarity of the base sequence; map the base sequence and the modified sequence to a first frequency region having a frequency higher than a center subcarrier and a second frequency region having a frequency lower the center subcarrier, so that the base sequence and the modified sequence are symmetric centering the center subcarrier located at a center frequency of a frequency domain of the first synchronization signal; generate a first sequence and a second sequence, which are different from each other, for generation of the second synchronization signal; generate a third sequence by performing an element-wise exclusive-OR operation between the first sequence and the second sequence; generate the second synchronization signal based on the third sequence; and transmit the first and second synchronization signals to the terminal.

The base sequence may be a complex sequence, and the instructions may further cause the base station to generate the modified sequence by inverting polarity of at least one of real parts and imaginary parts of the base sequence.

The base sequence may be a binary sequence, and the instructions may further cause the base station to generate the modified sequence by inverting polarity of real parts of the base sequence.

The first synchronization signal may be a primary synchronization signal (PSS) for a time/frequency synchronization (TFS) estimation at the terminal, the PSS may be generated based on a first optimal sequence set, and the first optimal sequence set may be selected based on an effective cross-correlation value between sequences constituting each of a plurality of candidate sequence sets generated based on an accumulated auto-correlation value for an effective time synchronization range for each of a plurality of sequences constituting the base sequence.

The instructions may further cause the base station to generate a first binary sequence and a second binary sequence which are different from each other; generate the first sequence by applying a first shift index to the first binary sequence; and generate the second sequence by applying a second shift index to the second binary sequence.

A first scaling factor and a second scaling factor, which are different from each other, may be applied to the first shift index and the second shift index, respectively.

The second synchronization signal may be a secondary synchronization signal (SSS) for a physical cell ID (PCI) estimation at the terminal, and the first and second shift indices may be generated based on a PCI index of the base station.

The instructions may further cause the base station to set a value at an n-th position of the third sequence to 1 when a value at the n-th position of the first sequence is different from a value at the n-th position of the second sequence; and set the value at the n-th position of the third sequence to 0 when the value at the n-th position of the first sequence is equal to the value at the n-th position of the second sequence.

The instructions may further cause the base station to set a value at an n-th position of the synchronization signal based on the third sequence to a first setting value when a value at the n-th position of the third sequence is 0; and set the value at the n-th position of the synchronization signal based on the third sequence to a second setting value when the value at the n-th position of the third sequence is 1, wherein the second setting value is set to −1 when the first setting value is set to 1, and the second setting value is set to 1 when the first setting value is set to −1.

According to an exemplary embodiment of the present disclosure, the base station and the terminal of the communication system transmit and receive a PSS including a base sequence and a modified sequence having a polarity inverted from the base sequence and having a centrally symmetric mapping (CSM) relationship with the base sequence, so that a time/frequency synchronization procedure can be performed efficiently even when a frequency offset exists or the terminal moves fast.

According to an exemplary embodiment of the present disclosure, the base station and the terminal of the communication system transmit and receive an SSS defined based on an exclusive-OR operation between two different binary pseudo-noise (PN) sequences, so that a physical cell ID (PCI) estimation procedure can be performed efficiently even when inter-cell interferences exist.

BRIEF DESCRIPTION OF DRAWINGS

FIG. 5 is a sequence chart illustrating an exemplary embodiment of a method of mapping a PSS sequence element to a slot of a subframe according to the present disclosure.

FIG. 6 is a conceptual diagram illustrating a third exemplary embodiment of a PSS sequence mapping method according to the present disclosure.

DETAILED DESCRIPTION OF THE EMBODIMENTS

Figure 1:
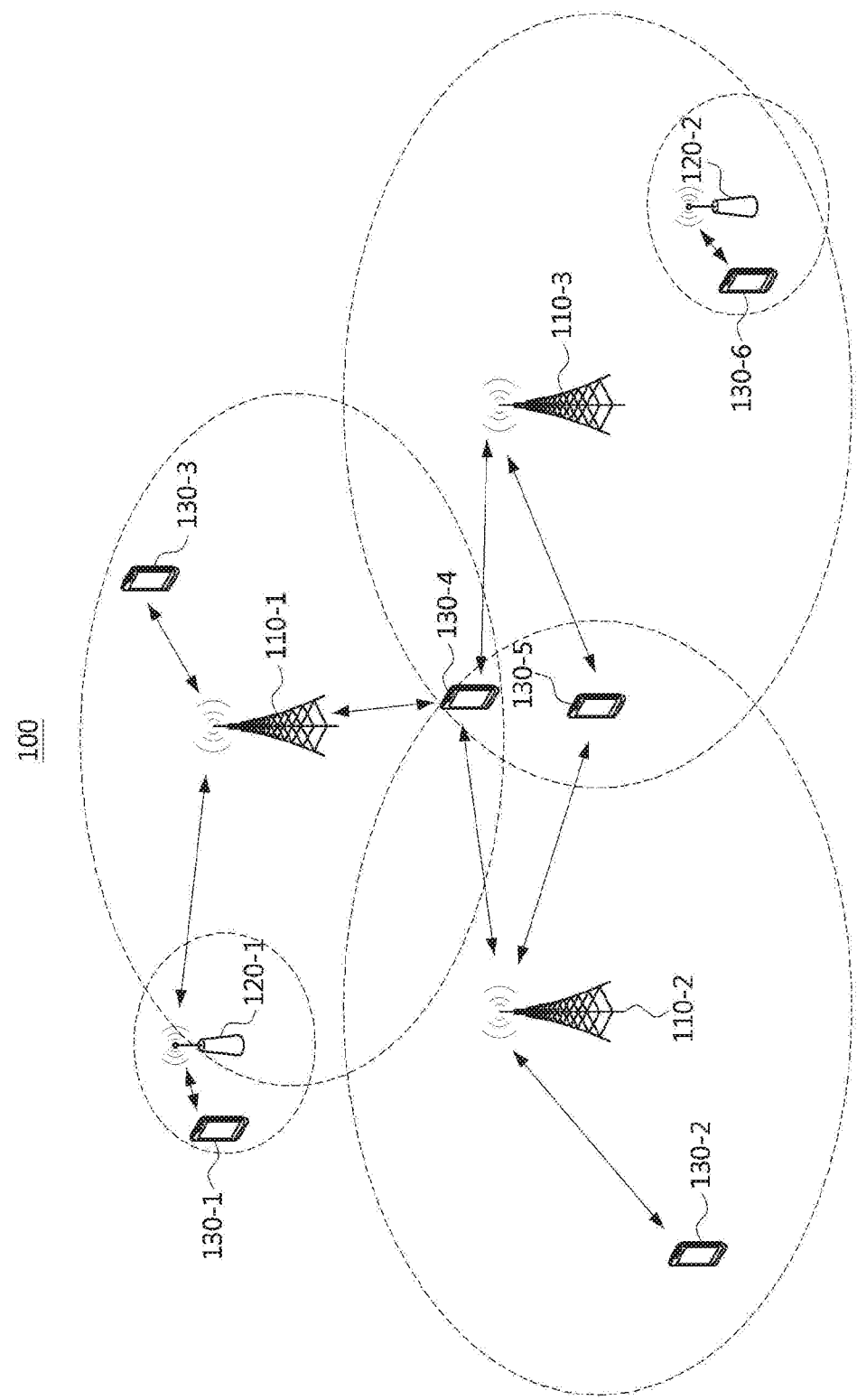
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)).

The plurality of communication nodes may support 4G communication protocol (e.g., long term evolution (LTE), LTE-advanced (LTE-A)), 5G communication (e.g., new radio (NR)), etc. defined by the 3rd generation partnership project (3GPP) specifications. Alternatively, a wireless communication system using a synchronization signal proposed by the present disclosure may be referred to as an alternative radio (AR) communication system, and a plurality of communication nodes may support the AR communication system.

The 4G communication may be performed in a frequency band of 6 GHz or below, and the 5G communication may be performed in a frequency band of 6 GHz or above as well as the frequency band of 6 GHz or below. For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
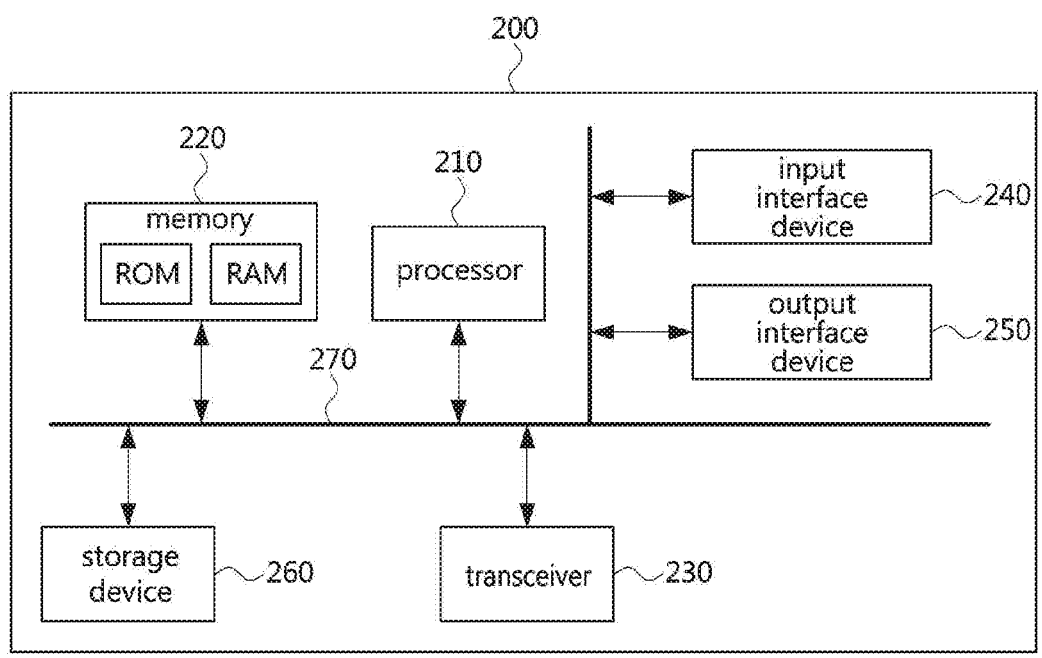
FIG. 2 is a block diagram illustrating a first exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-gNB, a base transceiver station (BTS), a radio base station, a radio transceiver, an access point, an access node, a road side unit (RSU), a radio remote head (RRH), a transmission point (TP), a transmission and reception point (TRP), a flexible (f)-TRP, or the like. Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal), an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in a communication system, a base station can perform all functions of a communication protocol (e.g., remote radio transmission/reception function, baseband processing function, etc.). Alternatively, the remote wireless transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of the backhaul link and the fronthaul link may be as follows. When a functional split technique of the communication protocol is applied, the TRP may selectively perform some functions of the BBU or some functions of the MAC/RLC.

Figure 3:
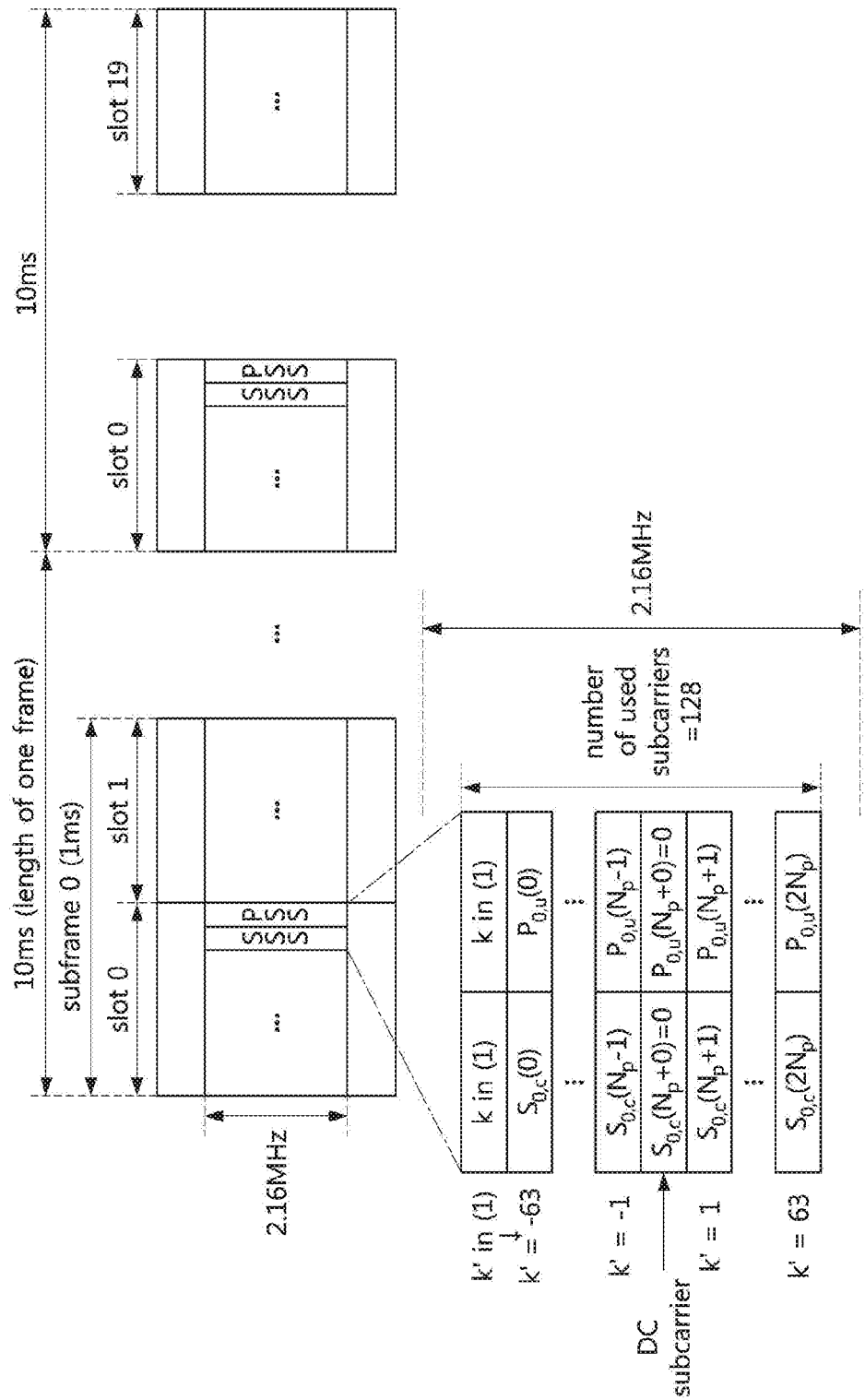
FIG. 3 is a conceptual diagram illustrating an exemplary embodiment of a radio frame structure in a communication system according to the present disclosure.

FIG. 3 is a conceptual diagram illustrating an exemplary embodiment of a radio frame structure in a communication system according to the present disclosure.

Referring to FIG. 3, one radio frame in a communication system may be composed of 10 subframes, and one subframe may be composed of 2 time slots. One time slot may have a plurality of symbols in the time domain, and may include a plurality of subcarriers in the frequency domain. The plurality of symbols in the time domain may be OFDM symbols. Hereinafter, for convenience, an exemplary embodiment in which the plurality of symbols in the time domain are OFDM symbols is described as an example, but exemplary embodiments of the present disclosure are not limited thereto.

One slot may have 6 (i.e., extended cyclic prefix (CP) case) or 7 (i.e., normal CP case) OFDM symbols. A time-frequency region defined by one slot may be referred to as a resource block (RB). When one slot has 7 OFDM symbols, one subframe may have 14 OFDM symbols (i.e., l=0, 1, 2, . . . , 13).

The subframe may be divided into a control region and a data region. A physical downlink control channel (PDCCH) may be allocated to the control region. A physical downlink shared channel (PDSCH) may be allocated to the data region. Some of the subframes may be special subframes. The special subframe may include a downlink pilot time slot (DwPTS), a guard period (GP), and an uplink pilot time slot (UpPTS). The DwPTS may be used for time and frequency synchronization estimation and cell search of the terminal. The GP may be a period for avoiding interferences caused by multipath delays of downlink signals.

The synchronization signal, which is information necessary for cell ID estimation and time/frequency synchronization, may be mapped to the DwPTS. The synchronization signal may include a primary synchronization signal (PSS) and a secondary synchronization signal (SSS).

One PSS and one SSS may be arranged in each frame. For example, a frame structure, in which a pair of the PSS and the SSS are arranged adjacent to each other in the time domain, and arranged in a center of a system bandwidth in the frequency domain every 10 ms, may be configured. A frame may consist of 10 subframes. Each subframe may be composed of 2 time slots, each slot may be composed of 7 OFDM symbols, and the number of symbols constituting one subframe may be 14 (i.e., l=0, 1, 2, . . . , 13). The PSS and the SSS may be located in the second last symbol and the last symbol (i.e., l=5, 6) of a slot #0 in the time domain, respectively. Meanwhile, in the frequency domain, the PSS and the SSS may be mapped to $2N_P+1$ subcarriers (i.e., k=0, 1, 2, . . . , $2N_P$, or k=$-N_P$, . . . , −1, 0, 1, . . . $N^P$) or $2N_P$ subcarriers excluding a center subcarrier. Although an exemplary embodiment in which $N_P$ is 63 is illustrated in FIG. 3, this is only an example for convenience of description, and exemplary embodiments of the present disclosure are not limited thereto. In an exemplary embodiment, the subcarrier spacing may be 15 kHz. In this case, a minimum downlink sampling rate of the base station or the transmitter may be 3.84 MHz, an inverse fast Fourier transform (IFFT) size may be 256, and a cyclic prefix (CP) may last as long as $N_{cp}^1$=20 in some symbols (i.e., l=0, 7), and may last as long as $N_{cp}^1$=18 in the remaining symbols (i.e., l=1, 2, . . . , 6, 8, 9, . . . , 13).

In addition, in exemplary embodiments of the present disclosure, the method of arranging the PSS and the SSS in the time domain and frequency domain is not limited to the above-described method. The time-domain positions of the PSS and the SSS within the frame may vary according to a division duplex scheme of the cell. For example, in case of a frequency division duplex (FDD) scheme, the PSS may be transmitted as mapped to the last OFDM symbols of the first slots of the subframes #0 and #5. In addition, the SSS may be transmitted as mapped to the second last OFDM symbols of the first slots of the subframes #0 and #5. In case of a time division duplex (TDD) scheme, the PSS may be transmitted as mapped to the third symbols of the subframes #1 and #6. In addition, the SSS may be transmitted as mapped to the last symbols of the subframes #0 and #5.

In the frequency domain, a baseband signal related to the synchronization signal may be expressed as $X_{f',f}^{c,l}[k]$. Here, f may mean a frame index, f' may mean a subframe index, and c may mean a PCI index. f' may have an integer value from 0 to 9. c may have a value from 0 to Q×G−1. Here, Q may mean the total number of physical IDs (PIDs), and G may mean the total number of cell group IDs (CGIs). The PID and the CGI may be 3 and 336, respectively, as in the NR communication system. In the time domain, a signal $\tilde{x}_{d',f}^{c,l}[n]$ corresponding to $X_{f',f}^{c,l}[k]$ may defined as Equation 1.

$$\tilde{x}_{f',f}^{c,l}[n] = \sum_{k'=-N_p}^{N_p} X_{f',f}^{c,l}[k] \times e^{-j\frac{2\pi k(n-N_{cp})}{N}}, \; 0 \le n \le N_{cp}^l + N \quad \text{[Equation 1]}$$

Here, $X_{f',f}^{c,l}[k]$ may correspond to a PSS sequence $P_{0,a}[k]$ or an SSS sequence $S_{0,c}[k]$ according to a value of l. An average transmission power at the transmitter may be defined as $E_s = E\{|\tilde{x}_{d',f}^{c,l}[n]|^2\}$. When the signal $\tilde{x}_{f',f}^{c,l}[n]$ is expressed in form of a vector having a size of $(N+N_{cp}^l) \times 1$, it may be expressed as $\tilde{x}_{f',f}^{c,l}$ in Equation 2.

$$\tilde{x}_{f',f}^{c,l} = F_- \underbrace{\left[ X_{f',f,+}^{c,l} \; O_{\frac{N}{2}+1} \; X_{f',f,-}^{c,l} \right]^T}_{X_{f',f}^{c,l}: \; IFFT \; input} = \left[ X_{cp,f',f}^{c,l} \; X_{f',f}^{c,l} \right]^T \quad \text{[Equation 2]}$$

$$X_{f',f,+}^{c,l} = \left[ X_{f',f}^{c,l}(N_P) \; X_{f',f}^{c,l}(N_P+1) \; \cdots \; X_{f',f}^{c,l}(2N_P) \right]$$

$$X_{f',f,-}^{c,l} = \left[ X_{f',f}^{c,l}(0) \; X_{f',f}^{c,l}(1) \; \cdots \; X_{f',f}^{c,l}(N_P-1) \right]$$

Here, $$O_{\frac{N}{2}+1}$$

may mean a zero vector having a size of $$1 \times \left(\frac{N}{2} + 1\right).$$

$X_{cp,f',f}^{c,l}$ may mean a baseband time-domain signal vector having a size of $(1 \times N_{cp}^{l})$ corresponding to a cyclic prefix (CP). $X_{f',f}^{x,l}$ may mean a baseband time-domain signal vector having a size of $(1 \times N)$ corresponding to an effective OFDM symbol. $F_{-}$ may mean an inverse fast Fourier transform (IFFT) matrix having a size of $(N+N_{cp}^{l}) \times N$. An $(m,n)$ element $(F_{-})_{n,m}$ of the matrix $F_{-}$ may be expressed as Equation 3.

$$(F_{-})_{n,m} = e^{\left\{\frac{j2\pi(n-N_{cp}^l)m}{N}\right\}}, 0 \le n < N + N_{cp}^l, 0 \le m < N \quad \text{[Equation 3]}$$

Assuming a time varying frequency selective fading channel, a base band reception signal vector $\tilde{r}_{l,f',f}^{a}$ having a size of $(N+N_{cp}^{l}) \times 1$ corresponding to $\tilde{x}_{f',f}^{c,l}$ of Equation 2 may be expressed as Equation 4.

[Equation 4]

$$\tilde{r}_{l,f',f}^{a} = E_{l,f',f}^{c,a} H_{l,f',f}^{c,a} \tilde{x}_{f',f}^{c,l} + \sum_{c' \ne c}\{E_{l,f',f}^{c',a} H_{l,f',f}^{c',a} \tilde{x}_{f',f}^{c',l}\} + [z_{l,f',f}^{cp,a} \ z_{l,f',f}^{c,a}]^T$$

$$= [r_{l,f',f}^{cp,a} \ r_{l,f',f}^{c,a}]^T$$

Here, a may mean an index of a reception antenna. $r_{cp,f',f}^{c,l}$ may mean a baseband reception time-domain signal vector having a size of $(1 \times N_{cp}^{l})$ corresponding to the CP. $r_{f',f}^{c,l}$ may mean a baseband reception time-domain signal vector having a size of $(1 \times N)$ corresponding to an effective OFDM symbol. $z_{l,f',f}^{cp,a}$ may mean a complex Gaussian random variable vector having a mean of 0, a variance of $N_o$, and a size of $(1 \times N_{cp}^{l})$ corresponding to the CP. $z_{l,f',f}^{a}$ may mean a complex Gaussian random variable vector having an average of 0, a variance of $N_o$, and a size of $(1 \times N)$ corresponding to an effective OFDM symbol.

In Equation 4, the second term $\Sigma_{c' \ne c}\{E_{l,f',f}^{c',a} H_{l,f',f}^{c',a} \tilde{x}_{f',f}^{c',l}\}$ on the right side may mean interferences from adjacent cells. In Equation 4, the third term $[z_{l,f',f}^{cp,a} \ z_{l,f',f}^{c,a}]^T$ on the right side may mean interferences from adjacent cells.

In Equation 4, $E_{l,f',f}^{c,a}$ may mean a diagonal matrix having a size of $(N+N_{cp}^{l}) \times (N+N_{cp}^{l})$, which is directly related to the carrier frequency offset (CFO). $E_{l,f',f}^{c,a}$ and $C_{l,f',f}^{c,a}(n)$ may be expressed as in Equation 5.

$$E_{l,f',f}^{c,a} = diag\{E_{l,f',f}^{c,a}(0) \ldots E_{l,f',f}^{c,a}(N + N_{cp}^l - 1)\} \quad \text{[Equation 5]}$$

$$E_{l,f',f}^{c,a}(n) = e^{\frac{j2\pi\varepsilon_c n}{N}}$$

Here, $\varepsilon_c$ may mean a CFO normalized according to the subcarrier spacing in PCI c.

In Equation 4, $H_{l,f',f}^{c,a}$ means a matrix having a size of $(N+N_{cp}^{l}) \times (N+N_{cp}^{l})$, which is related to a time impulse response of time-varying fading. An $(n,k)$ element $(H_{l,f',f}^{c,a})_{n,k}$ of the matrix $H_{l,f',f}^{c,a}$ may be expressed as Equation 6.

$$(H_{l,f',f}^{c,a})_{n,k} = h(n, [n-k]_{N+N_{cp}^l}) \quad \text{[Equation 6]}$$

Here, the time-varying path gain $h(n,\xi)$ may mean the $\xi$-th multipath element normalized by a sample time n. Meanwhile, in the present disclosure, $[y]_m$ may mean a modulo-m function for an integer y. Here, when y is negative, $[y]_m$ may be equal to $[m+y]_m$.

The base station may map a base sequence and a modified sequence to the synchronization signal and transmit the same to the terminal, and the terminal receiving the synchronization signal may measure a reception correlation value of the synchronization signal. As a result of measuring the correlation value between the synchronization signal and the cell ID, the terminal may regard a sample time offset (STO) when the correlation value has the highest value as a time synchronization point.

The problem of the conventional art is that the synchronization estimation performance may be deteriorated when the frequency offset of the radio signal is severe. In addition, when a complex sequence is mapped to subcarriers, the terminal receiving the synchronization signal may perform a complex product operation on the sequence of the synchronization signal to measure the reception correlation value of the synchronization signal. This may mean that a complicated operation such as the complex value operation may be performed to measure the reception correlation value of the synchronization signal received by the terminal.

Figure 4A:
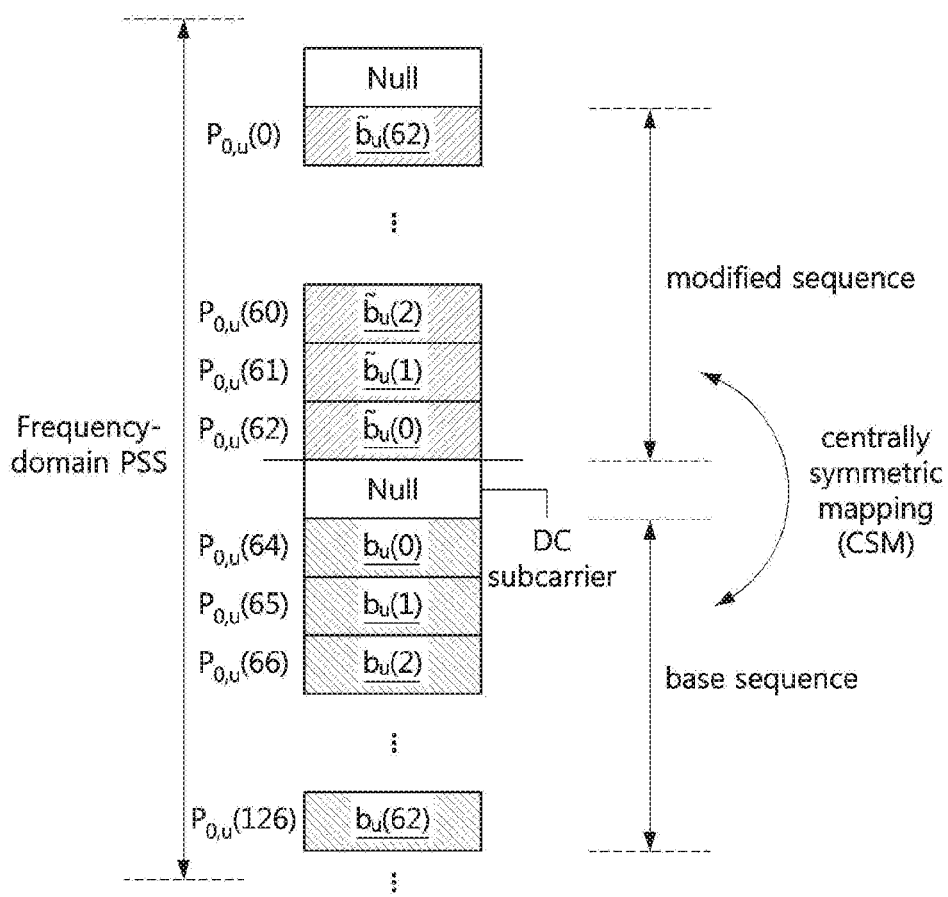
FIGS. 4A and 4B are conceptual diagrams illustrating first and second exemplary embodiments of a primary synchronization signal (PSS) sequence mapping method according to the present disclosure.
Figure 4B:
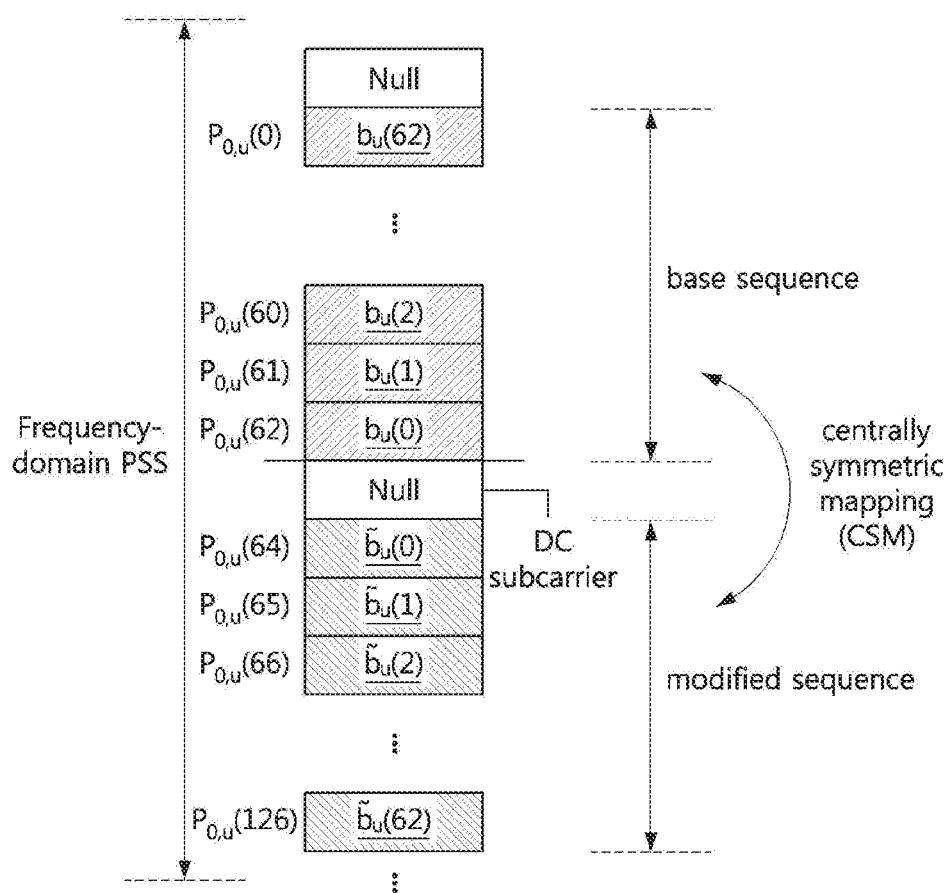

FIGS. 4A and 4B are conceptual diagrams illustrating first and second exemplary embodiments of a primary synchronization signal (PSS) sequence mapping method according to the present disclosure.

Referring to FIGS. 4A and 4B, a method of mapping a PSS sequence to a slot of a subframe according to an exemplary embodiment of the present disclosure is as follows. In an exemplary embodiment of the present disclosure, the PSS may occupy a plurality of subcarriers which are available frequency resources. The total number of frequency resources in the slot or the total number of subcarriers that the PSS can use may be represented by N. For example, N may be equal to or greater than 128.

The base station may map the PSS sequence to one slot of the subframe. In this case, the length of the PSS sequence may be expressed by $N_G$. Here, the length $N_G$ of the PSS sequence may be equal to or smaller than the total number N of frequency resources of the slot. The base station may map the PSS to $N_G$ subcarriers located in the center of the entire band of the slot.

The PSS may be composed of a base sequence $b_u(k)$ and a modified sequence $\tilde{b}_u(k)$ generated by modifying the base sequence. The base sequence $b_u(k)$ and the modified sequence $\tilde{b}_u(k)$ may be mapped to $N_p$ subcarriers, respectively. That is, the length $N_G$ of the PSS sequence may be equal to $2N_p$. Alternatively, the PSS may consist of the base sequence $b_u(k)$ and the modified sequence $\tilde{b}_u(k)$, and a first signal disposed between the base sequence and the modified sequence. The first signal may be a zero signal or a null signal. The first signal may be a direct current (DC) signal. The length $N_G$ of the PSS sequence may be equal to $2N_p+1$. In FIGS. 4A and 4B, exemplary embodiments in which $N_p$ is 63 are illustrated.

The entire PSS sequence may be expressed as $P_{0,u}(k)$. As described with reference to FIG. 3, in an exemplary embodiment, the PSS may be arranged in the last symbol (i.e., l=6) of the slot #0 of the subframe #0 in the time domain. That is, the PSS sequence $P_{0,u}(k)$ may be equal to $X_{0,f}^{c,6}[k]$.

As shown in FIGS. 4A and 4B, the base station may map $P_{0,u}(0)$ to a subcarrier having the highest frequency, and $2N_p+1$ elements up to $P_{0,u}(2N_p)$ to the PSS sequence in the order of low frequency. Alternatively, the base station may map $P_{0,u}(0)$ to the DC subcarrier and map up to $P_{0,u}(N_p)$ in order of low frequency, and then, the base station may map the remaining sequence elements in order from the subcarrier having the highest frequency.

The center subcarrier may be a subcarrier having a center frequency $f_c$ among a plurality of subcarriers in the slot. A puncturing scheme may be applied to the configuration of the center subcarrier. A signal may not be carried on the center subcarrier. The center subcarrier may have a null value or a zero value. The center subcarrier may be a DC subcarrier.

The base sequence $b_u(k)$ and the modified sequence $\tilde{b}_u(k)$ may be mapped to have a central symmetric relationship around the center subcarrier. Referring to FIG. 4A, in the first exemplary embodiment of the PSS sequence mapping method according to the present disclosure, an upper subcarrier group and a lower subcarrier group may be formed centering on the center subcarrier. The upper subcarrier group and the lower subcarrier group may each consist of $N_p$ subcarriers. The base sequence $b_u(k)$ may be mapped to $N_p$ subcarriers of the lower subcarrier group, and the modified sequence $\tilde{b}_u(k)$ may be mapped to $N_p$ subcarriers of the upper subcarrier group. In other words, with respect to the entire PSS sequence $P_{0,u}(k)$, a DC signal may be mapped to a position where $k=N_p$, or the center subcarrier, the base sequence $b_u(k)$ may be mapped to a section where $N_p+1 \leq k \leq 2N_p$, and the modified sequence $\tilde{b}_u(k)$ may be mapped to a section where $0 \leq k \leq N_p$. When expressed as an equation, it may be equal to Equation 7.

$$P_{0,u}(k) = \begin{cases} \tilde{b}_u(N_p - 1 - k), & 0 \leq k < N_p \\ 0, & k = N_p \\ b_u(k - N_p - 1), & N_p + 1 \leq k \leq 2N_p \end{cases}$$ [Equation 7]

Equation 7 shows an exemplary embodiment in which the base sequence $b_u(k)$ is mapped to the lower subcarrier group and the modified sequence $\tilde{b}_u(k)$ is mapped to the upper subcarrier group as shown in FIG. 4A, but exemplary embodiments of the present disclosure are not limited thereto. For example, referring to FIG. 4B, in the second exemplary embodiment of the PSS sequence mapping method according to the present disclosure, the base sequence $b_u(k)$ may be mapped to $N_p$ subcarriers of the upper subcarrier group, and the modified sequence $\tilde{b}_u(k)$ may be mapped to $N_p$ subcarriers of the lower subcarrier group. Alternatively, in an exemplary embodiment, the PSS sequence $P_{0,u}(k)$ may be mapped to the center subcarrier, and may or may not include the first signal or the DC signal defined as zero. The base station may or may not map the element of the PSS sequence $P_{0,u}(k)$ to the center subcarrier as in Equation 7.

In an exemplary embodiment of the present disclosure, the base sequence $b_u(k)$ may be defined as Equation 8.

$$b_u(k) = e^{-j\frac{\pi \mu_u k(k+1)}{N_p}}, 0 \leq k < N_p$$ [Equation 8]

Here, $\mu_u$ may mean an index of a ZC base sequence having a length of $N_p$. This exemplary embodiment may correspond to an exemplary embodiment in which a Zadoff-Chu (ZC) sequence is applied to the base sequence $b_u(k)$, but exemplary embodiments of the present disclosure are not limited thereto. That is, any possible complex sequence or binary sequence may be applied to the base sequence $b_u(k)$.

The modified sequence $\tilde{b}_u(k)$ generated by modifying the base sequence $b_u(k)$ may be defined as a conjugate form of the base sequence $b_u(k)$. That is, the modified sequence $\tilde{b}_u(k)$ may be as Equation 9. In the disclosure, the operator may mean a conjugate operator.

$$\tilde{b}_u(k) = b^*_u(k), 0 \leq k \leq N_p$$ [Equation 9]

Alternatively, the modified sequence $\tilde{b}_u(k)$ may be defined as $-b^*_u(k)$, which is a negative form of the conjugate complex value of the base sequence $b_u(k)$. Alternatively, the modified sequence $\tilde{b}_u(k)$ may be defined as $-b_u(k)$, which is a negative form of the base sequence $b_u(k)$.

In the PSS formed according to the central symmetric mapping (CSM) as described above, the respective elements ($0 \leq k < N_p$) of the base sequence $b_u(k)$ may be concatenated with the respective elements ($0 \leq k < N_p$) of the modified sequence $\tilde{b}_u(k)$ having a symmetrical relationship with each other around the center subcarrier. Since the modified sequence $\tilde{b}_u(k)$ is defined as the conjugate complex value of the base sequence $b_u(k)$ or a form similar thereto, a result of such the central symmetric concatenation (CSC) may be expressed in form of a real value or imaginary value.

The problem of the conventional art is that the synchronization estimation performance may be deteriorated when the frequency offset of the radio signal is severe. In addition, when a complex sequence is mapped to subcarriers, the terminal receiving the synchronization signal has a problem that a complicated operation such as a complex multiplication operation should be performed on the sequence of the synchronization signal in order to measure the correlation value of the synchronization signal.

When the central symmetric concatenation (CSC) operation is performed on the PSS designed by the central symmetric mapping (CSM) method according to the exemplary embodiment of the present disclosure, the operation result may be simplified to a real value form or an imaginary value form. Through this, the complexity of the time/frequency synchronization (TFS) estimation operation through the PSS according to the exemplary embodiment of the present disclosure may be reduced by half. That is, according to the present disclosure, the terminal may receive the PSS mapped and transmitted by the CSM method from the base station, and perform the central symmetric concatenation (CSC) operation, thereby performing low complexity, high accuracy, and efficient time/frequency synchronization (TFS).

Figure 7:
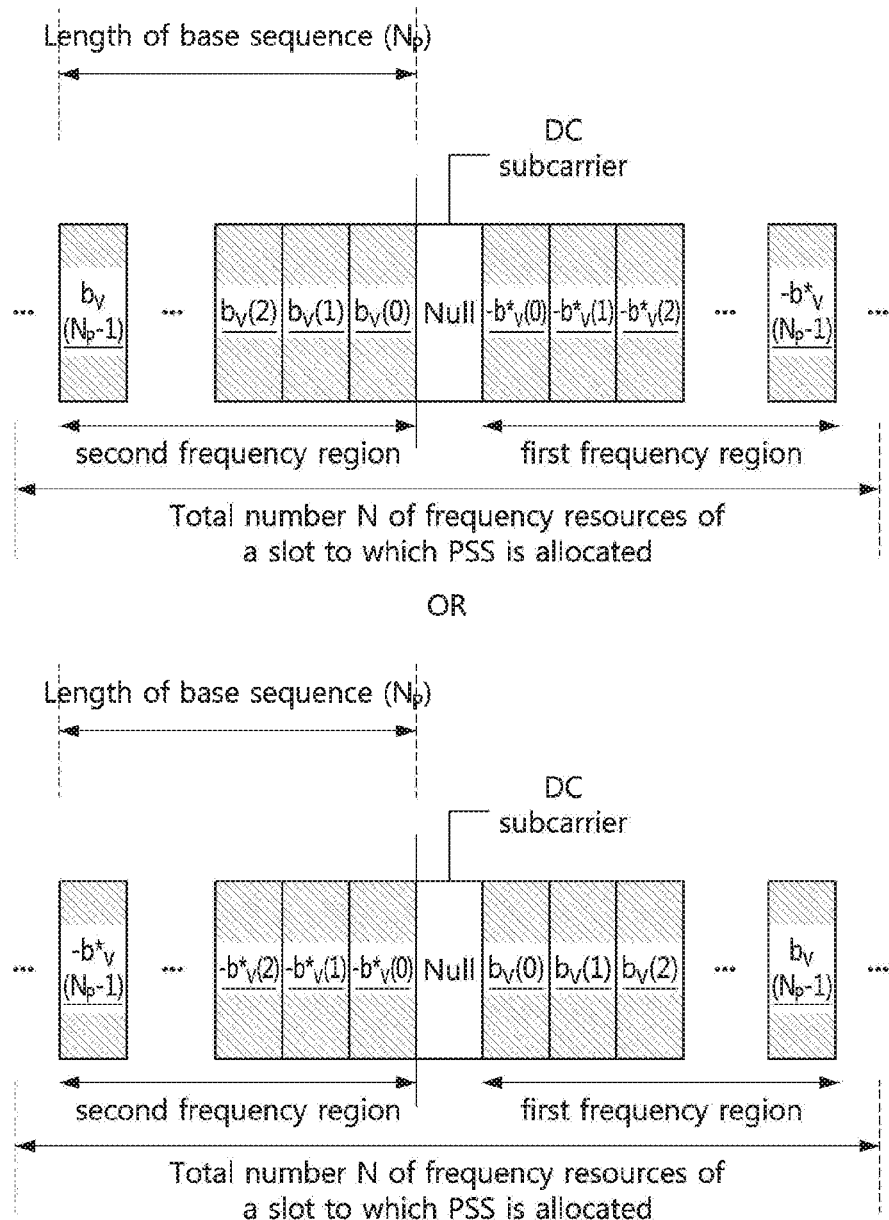
FIG. 7 is a conceptual diagram illustrating a fourth exemplary embodiment of a PSS sequence mapping method according to the present disclosure.
Figure 8:
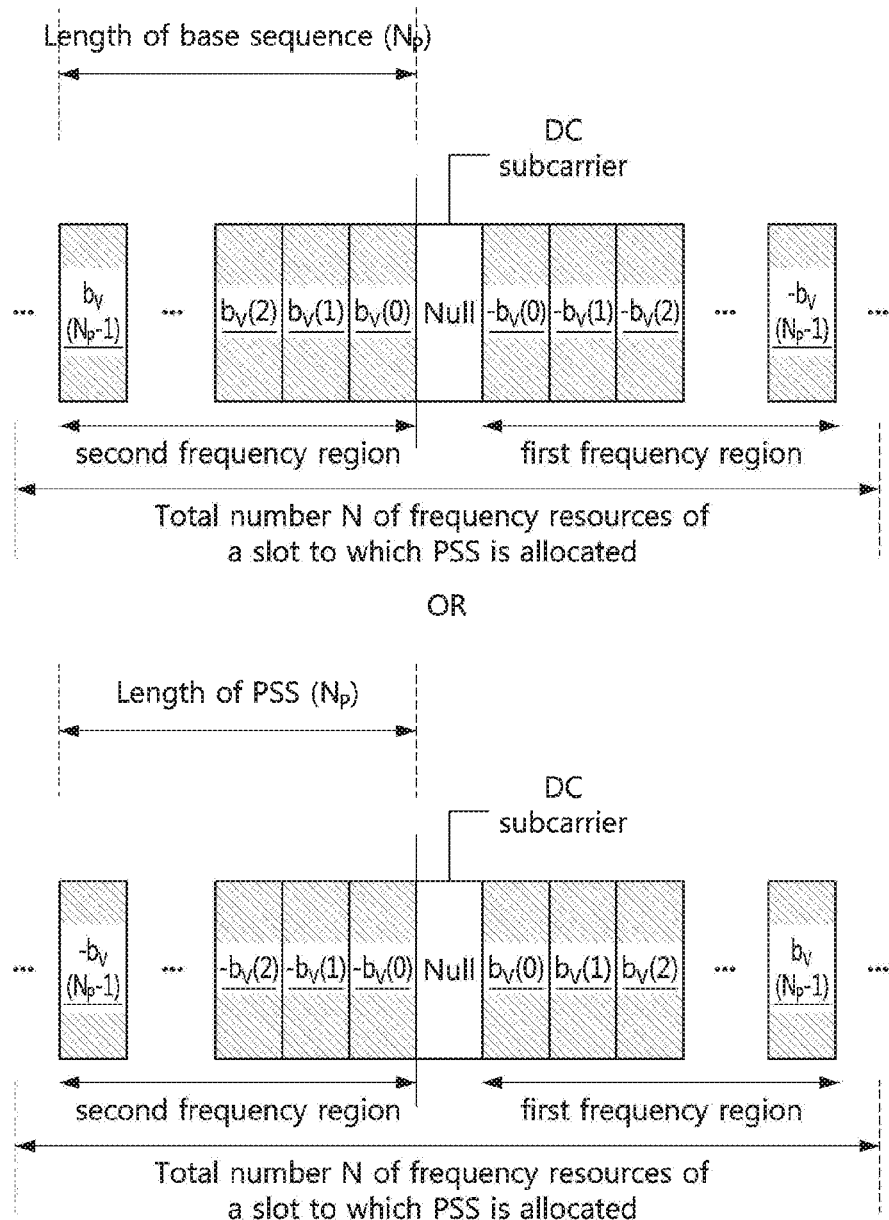
FIG. 8 is a conceptual diagram illustrating a fifth exemplary embodiment of a PSS sequence mapping method according to the present disclosure.

FIG. 5 is a sequence chart illustrating an exemplary embodiment of a method of mapping a PSS sequence element to a slot of a subframe according to the present disclosure, and FIGS. 6 to 8 are conceptual diagrams illustrating third to fifth exemplary embodiments of a PSS sequence mapping method according to the present disclosure. Referring to FIGS. 5 to 8, a method of mapping a PSS sequence according to the present disclosure may be as follows.

One of a plurality of subcarriers in a slot to which the PSS is mapped may be a DC subcarrier. The DC subcarrier may be a subcarrier to which a sequence element is not mapped. The DC subcarrier may be a subcarrier having a center frequency $f_c$ among the plurality of subcarriers.

The slot of the subframe, to which the synchronization signal is mapped, may be divided into two frequency regions (e.g., a first frequency region and a second frequency region). The plurality of subcarriers may be divided based on the DC subcarrier. For example, the base station may define a set of subcarriers having a frequency lower than the DC subcarrier among the plurality of subcarriers as the first frequency region, and a set of subcarriers having a frequency higher than the DC subcarrier as the second frequency region.

The number of subcarriers in the first frequency region and the number of subcarriers in the second frequency region may be the same. For example, when the number of subcarriers in the first frequency region is $N_P$, which is the length of the base sequence, the number of subcarriers in the second frequency region may also be $N_P$.

The PSS may be a combination of a plurality of sequences. One of the plurality of sequences constituting the PSS may be a base sequence $b_V(k)$. The base station may map the base sequence $b_V(k)$ to the slot of the subframe (S510). The base station may map the base sequence to one of the two frequency regions of the slot. For example, the base station may map the base sequence to subcarriers in the first frequency region among the frequency regions of the slot (S510).

The base sequence constituting the PSS may be a complex sequence. In an exemplary embodiment, the base sequence $b_V(k)$ constituting the PSS may be expressed as Equation 10.

$$b_V(k) = e^{-j\frac{\pi\mu_V k(k+1)}{N_P}}, 0 \le k < N_P \quad \text{[Equation 10]}$$

In FIG. 5 and Equation 10, V may mean a sequence index of the base sequence, k may mean an element index of the base sequence, $N_P$ may mean the length of the base sequence, and $\mu_V$ may mean an index of a ZC base sequence having a length of $N_P$. This exemplary embodiment may correspond to an exemplary embodiment in which a ZC sequence is applied to the base sequence $b_u(k)$, but exemplary embodiments of the present disclosure are not limited thereto. That is, any possible complex sequence or binary sequence may be applied to the base sequence $b_u(k)$.

The base station may map each element of the base sequence according to a frequency of a subcarrier of the slot. For example, $b_V(0)$ may be mapped to a subcarrier having the largest frequency among the subcarriers in the first frequency region, and $b_V(N_P-1)$ may be mapped to a subcarrier having the smallest frequency among the subcarriers in the first frequency region.

The PSS may have a composition in which the base sequence $b_V(k)$ and the modified sequence $\tilde{b}_V(k)$ are combined. The base station may generate the modified sequence $\tilde{b}_V(k)$ that is a separate sequence from the base sequence based on the base sequence (S520). The base station may generate sequence elements of the modified sequence $\tilde{b}_V(k)$ from the sequence elements of the base sequence $b_V(k)$ by performing a preconfigured operation.

According to an exemplary embodiment of the present disclosure, the base station may invert polarity of at least one of a real part and an imaginary part of the element of the base sequence $b_V(k)$ in order to generate the modified sequence $\tilde{b}_V(k)$.

According to the third exemplary embodiment shown in FIG. 6, the base station may perform an operation of Equation 11 to generate the modified sequence from the base sequence (S520).

$$\tilde{b}_V(k) = b^*_V(k), 0 \le k < N_P \quad \text{[Equation 11]}$$

In the third exemplary embodiment shown in FIG. 6, the base station may generate the modified sequence by inverting polarity of the imaginary part of each element of the base sequence (S520). The synchronization signal designed as described above may be a signal composed of only real parts in the time domain.

According to the fourth exemplary embodiment shown in FIG. 7, the base station may perform an operation of Equation 12 to generate the modified sequence from the base sequence (S520).

$$\tilde{b}_V(k) = -b^*_V(k), 0 \le k < N_P \quad \text{[Equation 12]}$$

In the fourth exemplary embodiment shown in FIG. 7, the base station may generate the modified sequence by inverting polarity of the real part of each element of the base sequence (S520). The synchronization signal designed as described above may be a signal composed of only imaginary parts in the time domain.

According to the fifth exemplary embodiment shown in FIG. 8, the base station may perform an operation of Equation 13 to generate the modified sequence from the base sequence.

$$\tilde{b}_V(k) = -b_V(k), 0 \le k < N_P \quad \text{[Equation 13]}$$

In the fifth exemplary embodiment shown in FIG. 8, the base station may generate the modified sequence by inverting polarities of the real and imaginary parts of each element of the base sequence.

The base station may map the modified sequence $\tilde{b}_V(k)$ to the subcarriers of the slot of the subframe (S530). Specifically, the base station may map the modified sequence to a frequency region to which the base sequence is not mapped among the subcarriers of the slot. When the base sequence is mapped to the first frequency region of the frequency band, the base station may map the modified sequence $\tilde{b}_V(k)$ to the second frequency region of the frequency band (S530).

When the base station maps the modified sequence to the second frequency region, the base station may map the modified sequence such that the sequence element indices of the base sequence and the sequence element indices of the modified sequence are symmetrical with respect to the DC subcarrier (S530).

For example, $b_V(0)$ may be mapped to a subcarrier having the largest frequency among the subcarriers in the first frequency region, and $b_V(N_P-1)$ may be mapped to a subcarrier having the smallest frequency among the subcarriers in the first frequency region. In this case, $\tilde{b}_V(k)$ may be mapped to a subcarrier having the smallest frequency among the subcarriers in the second frequency region, and $\tilde{b}_V(N_P-1)$ may be mapped to a subcarrier having the largest frequency among the subcarriers in the second frequency region.

Two PSSs within one radio frame in one cell may be identical to each other. The PSS of one cell may have a different value according to a physical layer cell ID of the cell. The terminal may select a PSS sequence for a correlation characteristic level between the base and modified sequences therefrom and the cell ID that satisfies a preconfigured condition, and may map the sequence so that the sequence corresponds to the cell ID. For example, when three sequences having sequence indices V of 0, 1, and 2 are selected based on the correlation characteristic level of the base sequence, a first cell group ID may be mapped to the base sequence of the sequence index V=0. The terminal may map a second cell group ID to the base sequence of the sequence index V=1, and a third cell group ID to the base sequence of the sequence index V=2.

In FIGS. 4 to 8, for convenience of description, a method of mapping the PSS sequence or the PSS sequence element has been described as an example, but exemplary embodiments of the present disclosure may be applied to mapping of various sequences and their elements to a frequency region of a communication signal as well as the PSS.

Figure 9:
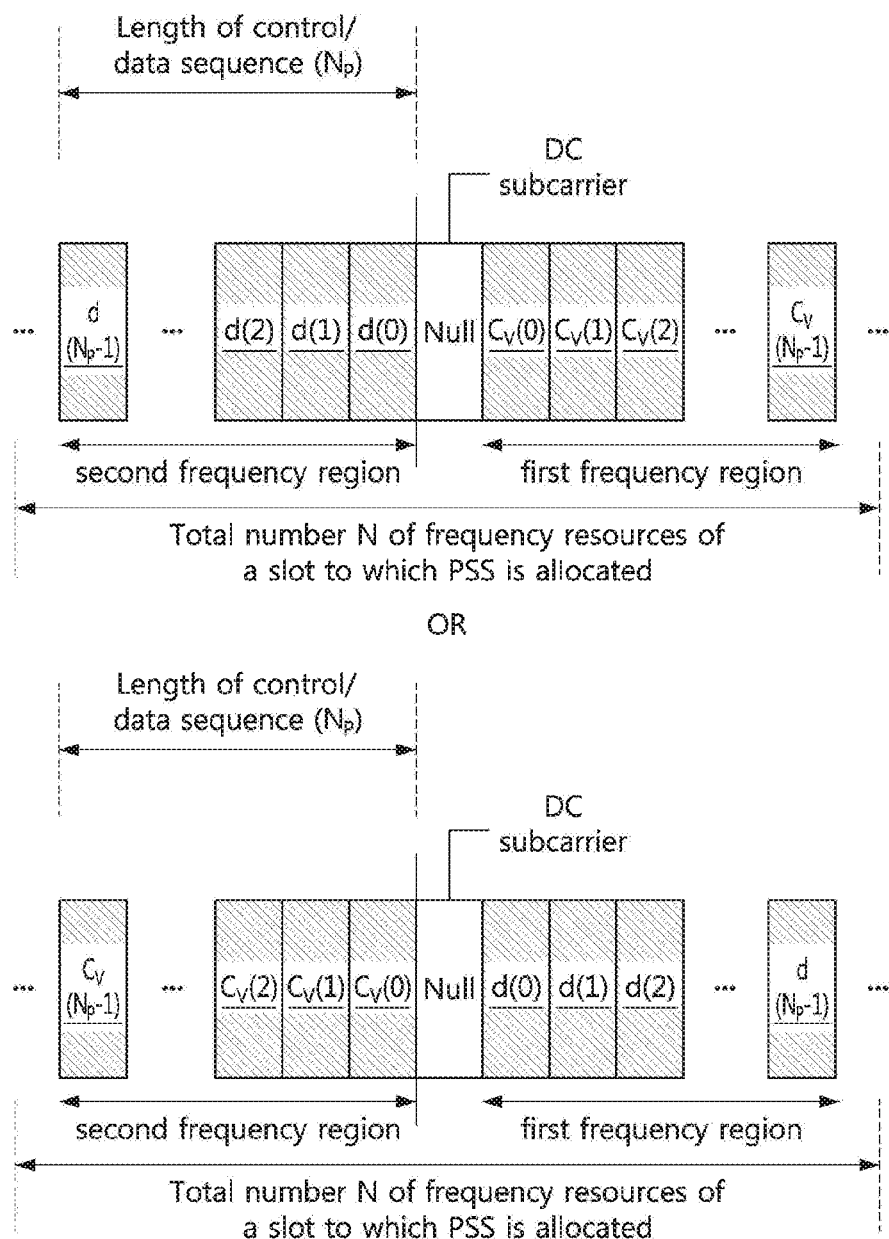
FIG. 9 is a conceptual diagram illustrating an exemplary embodiment of a method for mapping a control sequence and a data sequence according to the present disclosure.

FIG. 9 is a conceptual diagram illustrating an exemplary embodiment of a method for mapping a control sequence and a data sequence according to the present disclosure. Referring to FIGS. 5 and 9, a method of mapping a sequence to a slot of a control region and a data region of a signal according to the present disclosure may be as follows.

One subcarrier among a plurality of subcarriers of a PDCCH or PDSCH may be a DC subcarrier. The DC subcarrier may be a subcarrier having a center frequency among the plurality of subcarriers in a control region and a data region. The DC subcarrier may be a subcarrier to which a sequence element is not mapped.

The frequency band to which the signal is mapped may be divided into two frequency regions (e.g., a first frequency region and a second frequency region). A plurality of subcarriers may be classified based on the DC subcarrier. For example, the base station may define a set of subcarriers having a frequency lower than the DC subcarrier among the plurality of subcarriers as the first frequency region, and a set of subcarriers having a frequency higher than the DC subcarrier among the plurality of subcarriers as the second frequency region.

The number of subcarriers in the first frequency region and the number of subcarriers in the second frequency region may be the same. For example, if the number of subcarriers in the first frequency region is $N_P$ which is the length of the control and data sequence, the number of subcarriers in the second frequency region may also be $N_P$.

The base station may map the control sequence $C_V(k)$ to the control region, and may map the control sequence to one frequency region of the control region. For example, the base station may map the control sequence to the first frequency region of the control region.

The base station may map the data sequence d(k) to the data region, and may map the data sequence to one frequency region of the data region. For example, the base station may map the data sequence to the first frequency region of the data region.

The control sequence mapped to the control region may be a complex sequence, and may be a binary sequence. Also, the data sequence mapped to the data region may be a complex sequence, and may be a binary sequence. However, the control sequence is not limited to those described in the present disclosure, and this also applies to the data sequence.

Hereinafter, the control sequence mapped to the control region is assumed to be a complex sequence.

Each sequence element of the control sequence may be mapped according to a frequency of a subcarrier. For example, d(0) may be mapped to a subcarrier having the highest frequency among the subcarriers in the first frequency region, and $d(N_P-1)$ may be mapped to a subcarrier having the lowest frequency among the subcarriers in the first frequency region.

The base station may generate a modified sequence $\tilde{C}_V(k)$ that is a separate sequence from the control sequence based on the control sequence. The base station may perform a preconfigured operation to generate a sequence element of the modified sequence $\tilde{C}_V(k)$ from a sequence element of the control sequence $C_V(k)$.

According to an exemplary embodiment of the present disclosure, the base station may invert polarity of at least one of a real part and an imaginary part of a sequence element of the control sequence $C_V(k)$ in order to generate the modified sequence $\tilde{C}_V(k)$.

According to an exemplary embodiment of the present disclosure, the base station may perform an operation of Equation 14 to generate the modified sequence from the control sequence.

$$\tilde{C}_V(k)=C^*_V(k), 0 \leq k < N_p \quad \text{[Equation 14]}$$

The base station may generate the modified sequence by inverting polarity of an imaginary part of a sequence element of the control sequence. The frequency domain control signal and data signal designed as described above may be signals having only real parts in the time domain.

According to another exemplary embodiment of the present disclosure, the base station may perform an operation of Equation 15 to generate the modified sequence from the control sequence.

$$\tilde{C}_V(k)=-C^*_V(k), 0 \leq k < N_p \quad \text{[Equation 15]}$$

The base station may generate the modified sequence by inverting polarity of a real part of a sequence element of the control sequence. The frequency-domain control signal and data signal designed as described above may be signals having only imaginary parts in the time domain.

According to another exemplary embodiment of the present disclosure, the base station may perform an operation of Equation 16 to generate the modified sequence.

$$\tilde{C}_V(k)=-C_V(k), 0 \leq k < N_p \quad \text{[Equation 16]}$$

The base station may generate the modified sequence by inverting the polarity of the real part and the imaginary part of the sequence element of the control sequence.

The base station may map the modified sequence $\tilde{C}_V(k)$ to a plurality of subcarriers in the slot. Specifically, the base station may map the modified sequence to a frequency region to which the control sequence is not mapped. When the control sequence is mapped to a first frequency region, the base station may map the modified sequence $\tilde{C}_V(k)$ to a second frequency region of the subcarriers of the slot.

When the base station maps the modified sequence to the second frequency region, the base station may map the modified sequence to the second frequency region such that sequence element indices of the control sequence and sequence element indices of the modified sequence are symmetrical with respect to the DC subcarrier.

For example, $C_V(0)$ may be mapped to a subcarrier having the largest frequency among the subcarriers in the first frequency region, and $C_V(N_P-1)$ may be mapped to a subcarrier having the smallest frequency among the subcarriers in the first frequency region. In this case, $\tilde{C}_V(0)$ may be mapped to a subcarrier having the smallest frequency among the subcarriers in the second frequency region, and $\tilde{C}_V(N_P-1)$ may be mapped to a subcarrier having the largest frequency among the subcarriers in the second frequency region.

Although a method of mapping the control sequence to the control region is described in the present disclosure, it will be apparent that the above may be applied to a method of mapping a data sequence. It will also be apparent that the sequence mapping method described in the present disclosure may be applied to mapping of other sequences as well as the control sequence and the data sequence.

Figure 10:
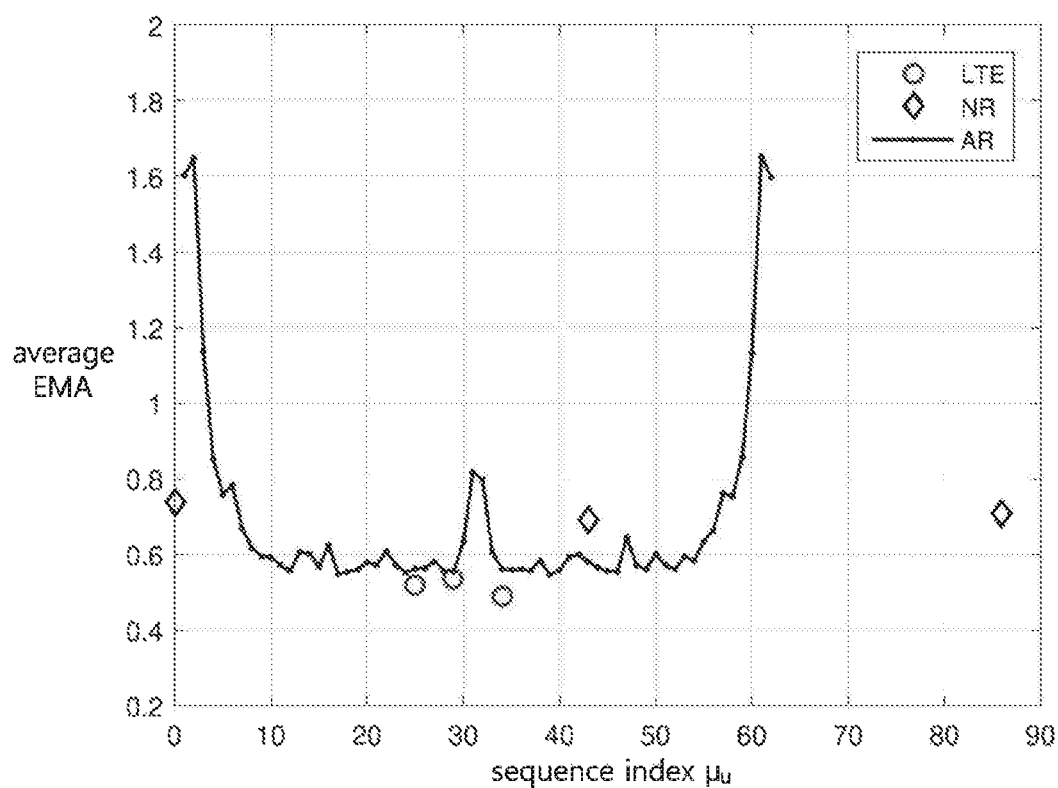
FIG. 10 is an exemplary graph for explaining an exemplary embodiment of a method for deriving optimal sequence indices applied to a PSS according to the present disclosure.

FIG. 10 is an exemplary graph for explaining an exemplary embodiment of a method for deriving optimal sequence indices applied to a PSS according to the present disclosure.

According to an exemplary embodiment of the present disclosure, the base station may transmit a primary synchronization signal (PSS) to the terminal. The PSS transmitted by the base station to the terminal may be the same as or similar to the PSS described with reference to FIGS. 3 to 5 and the like. The PSS may have high robustness with respect to a carrier frequency offset (CFO). In order to analyze the robustness of the PSS for the CFO, a function called 'effective margin accumulation (EMA)' may be defined as a function of the PSS sequence index $\mu_u$. The EMA may be expressed as Equation 17.

$$EMA(\mu_u) = \frac{1}{N} \sum_{\varphi' = -\lfloor \frac{N_{cp}^6}{2} \rfloor}^{-1} \left| \left(\check{r}_{6,0,f}^{0,\mu_u}\right)^T (\varphi' + N_{cp}^6) \cdot \left(\check{r}_{6,0,f}^{0,\mu_u}\right)^* (N_{cp}^6) \right| \quad \text{[Equation 17]}$$

Here, $\check{r}_{6,0,f}^{0,\mu_u}(\varphi)$ may be a component vector having a size of (1×N), which is obtained by substituting 0 into the reception antenna index a, 6 into the symbol index l, and 0 into the subframe index f' of $\check{r}_{l,f,f'}^{a}$ of Equation 4, and by excluding the second and third terms on the right from Equation 4. That is, $\check{r}_{6,0,f}^{0,\mu_u}(\varphi)$ may mean a component vector having a size of (1×N), which is defined assuming an environment where one reception antenna is used, the PSS is disposed in the symbol #6 of the subframe #0, and influence of interference and noise from adjacent cells is neglected.

Referring to FIG. 10, the PSS in an exemplary embodiment of a communication system (AR) according to the present disclosure and the PSS in the conventional communication system (e.g., LTE or NR) are respectively analyzed according to the $EMA(\mu_u)$ function, and the analysis results are compared. However, the graph illustrated in FIG. 10 shows analysis results according to an exemplary situation configured for convenience of description, and exemplary embodiments of the present disclosure are not limited thereto.

As shown in FIG. 10, in an exemplary embodiment of the communication system according to the present disclosure, when the sequence index $\mu_u$ is 2 or 61, an average value of EMA ($\mu_u$) may be significantly higher than that in the conventional communication system (e.g., LTE, NR, etc.). In order to select the optimal three sequence indices $\mu_1$, and $\mu_2$, and $\mu_3$ applied to the PSS, candidate sets including 2 and 61 and some of the sequence indices (e.g., 1, 3, 60, 62, and the like) adjacent thereto may be selected. For example, four candidate sets such as {1, 2, 61}, {2, 3, 61}, {2, 60, 61}, and {2, 61, 62} may be selected as the candidates for the sequence index set {$\mu_1$, $\mu_2$, $\mu_3$}.

In order to select the optimal sequence index among the four candidate sets, an 'effective accumulative cross-correlation (EAC)' function using two sequence indices as variables may be defined. The EAC function $\Lambda(\mu_u, \mu'_u)$ may be defined as Equation 18.

$$\Lambda(\mu_u, \mu'_u) = \frac{1}{N} \sum_{\varphi' = -\lfloor \frac{N_{cp}^6}{2} \rfloor}^{-1} \left| \left(\check{r}_{6,0,f}^{0,\mu_u}\right)^T (\varphi' + N_{cp}^6) \cdot \left(\check{r}_{6,0,f}^{0,\mu'_u}\right)^* (N_{cp}^6) \right| \quad \text{[Equation 18]}$$

The EAC function defined in Equation 18 may have been defined under the same or similar conditions to the EMA function defined in Equation 17. In an exemplary embodiment of the present disclosure, $\mu_u$ and $\mu'_u$, which are variables of the EAC function, may be different sequence indices. When sequence indices constituting the selected four candidate sets are analyzed through the EAC function, for example, the results shown in Table 1 may be obtained.

TABLE 1

| ($\mu_u$, $\mu'_u$) | E{Λ} | ($\mu_u$, $\mu'_u$) | E{Λ} | ($\mu_u$, $\mu'_u$) | E{Λ} |
|---|---|---|---|---|---|
| (2, 61) | 0.0364 | (2, 3) | 0.0382 | (61, 62) | 0.0371 |
| (2, 1) | 0.0358 | (2, 60) | 0.0342 | (61, 3) | 0.0333 |
| (2, 62) | 0.0484 | (61, 1) | 0.0372 | (61, 60) | 0.0333 |

In an exemplary embodiment of the present disclosure, it may be determined that the lower the average EAC value, the better the cross-correlation. In an exemplary embodiment of the present disclosure, it may be determined that the smaller the difference between the selected average EAC values, the more the remaining adjacent cell interference becomes fair. In an exemplary embodiment of the present disclosure, a sequence index set {1, 2, 61} may be selected based on the analysis results shown in Table 1.

According to an exemplary embodiment of the present disclosure described above, it is possible to effectively derive optimal sequence indices applied to the primary synchronization signal (PSS). Through this, the communication system according to the present disclosure can have robustness against a high frequency offset and a Doppler effect according to a high moving speed.

Figure 11:
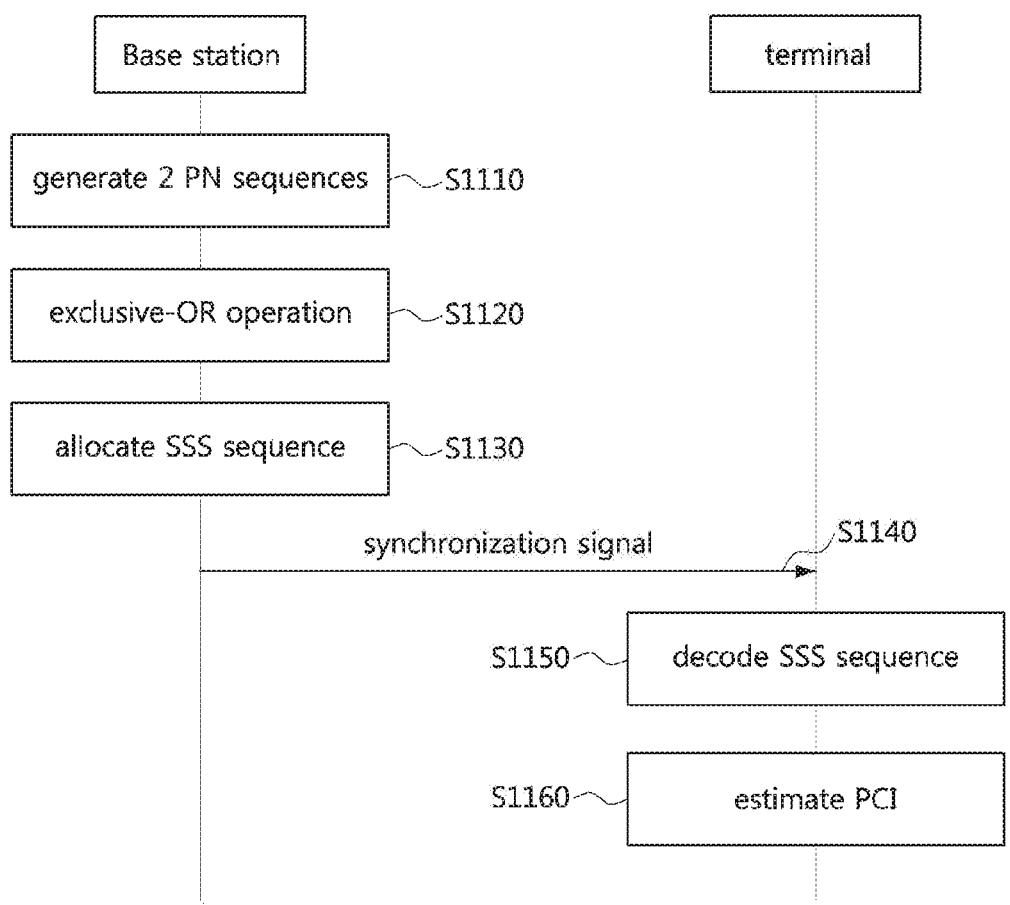
FIG. 11 is a sequence chart illustrating an exemplary embodiment of a secondary synchronization signal (SSS) sequence mapping method according to the present disclosure.

FIG. 11 is a sequence chart illustrating an exemplary embodiment of a secondary synchronization signal (SSS) sequence mapping method according to the present disclosure.

According to FIG. 11, the base station may map an SSS sequence to subcarriers of a slot. The SSS sequence may be expressed as $S_{0,c}(k)$. As described with reference to FIG. 3, in an exemplary embodiment, the SSS may be disposed in the second last symbol (i.e., l=5) of the slot #0 of the subframe #0 in the time domain. That is, the SSS sequence $S_{0,c}(k)$ may be equal to $X_{0,f}^{c,5}(k)$. $S_{0,c}(k)$ may have a length of $2N_p+1$. In an exemplary embodiment of the present disclosure, the SSS sequence $S_{0,c}(k)$ may be defined through an element-wise exclusive-OR operation between two different cyclic-shifted binary sequences $x_0(k)$ and $x_1(k)$. For example, the SSS sequence $S_{0,c}(k)$ may be defined as Equation 19.

$$S_{0,c}(k) = 1 - 2[x_0([k+m_0]_{127}) \oplus x_1([k+m_1]_{127})] x_0(i+7) = [x_0(i+4)+x_0(i)]_2 x_1(i+7) = [x_7(i+1)+x_1(i)]_2 [0000001] = \\ [x_0(6)x_0(5)x_0(4)x_0(3)x_0(2)x_0(1)x_0(0)][0000001] = \\ [x_1(6)x_1(5)x_1(4)x_1(3)x_1(2)x_1(1)x_1(0)] \quad \text{[Equation 20]}$$

Here, $x_0(k)$ and $x_1(k)$ may be binary pseudo-noise (PN) sequences. However, exemplary embodiments of the present disclosure are not limited thereto, and all possible different types of binary sequences may be applied. $x_0(k)$ and $x_1(k)$ may have a length of $2N_p+1$ like $S_{0,c}(k)$. The shift indices $m_0$ and $m_1$ may be set based on the PCI index c. A scaling factor may be applied to $m_0$ and $m_1$, respectively. The scaling factors applied to $m_0$ and $m_1$ may be 3 and 2, respectively. For example, in an exemplary embodiment of the present disclosure, $m_0$ and $m_1$ may be defined as Equation 20.

$$m_0 = 3(g_0 + 12u), \ m_1 = 2g_1 \ g_0 = \lfloor g/28 \rfloor, \ g_1 = [g]_{28} \ g = \lfloor c/3 \rfloor, \\ u = [c]_3 \ c = 3g + u \quad \text{[Equation 20]}$$

Here, the scaling factors 3 and 2 applied to $m_0$ and $m_1$ may be applied to improve robustness for the carrier frequency offset (CFO). In Equation 20, an example in which the scaling factors 3 and 2 are applied is shown, but exemplary embodiments of the present disclosure for convenience of description are not limited thereto.

When a CFO error occurs in an integer multiple in the synchronization signal transmitted and received in the wireless communication system, a subcarrier shift may occur in an integer multiple in the frequency domain, so that elements of the signal may belong to subcarriers shifted by an integer multiple than the original. Since the terminal or the receiving node receiving the signal does know in advance about the occurrence of the CFO, correlation may be performed based on the received and shifted subcarriers. When the correlation is performed according to the shifted subcarriers, a wrong PCI not belonging to the own serving cell may be detected. In an exemplary embodiment of the present disclosure, by applying scaling factors having different integer values to $m_0$ and $m_1$, the problem of interferences due to the presence of adjacent cells can be prevented, and the synchronization performance can be improved.

In the conventional communication system, binary multiplication operations and binary phase shift keying (BPSK) modulation operations such as $[1-2x_0]$ $[1-2x_1]=1-1x_0-2x_1+4x_0x_1$ are performed multiple times to generate the SSS sequence based on binary sequences such as $x_0$ and $x_1$. In this reason, there is a problem that the complexity of computation and hardware is high. According to an exemplary embodiment of the present disclosure, in the process of generating the SSS sequence, one binary sequence may be derived through the element-wise exclusive-OR operation (i.e., $x_0 \oplus x_1$) between the binary sequences $x_0$ and $x_1$, and thus, a relatively simple operation (i.e., $1-2[x_0 \oplus x_1]$) may be performed. Through this, the exemplary embodiments of the present disclosure have a technical effect that the complexity of computation and hardware is reduced.

The base station may generate different first and second sequences to generate the SSS sequence (S1110). The generated first and second sequences may be the same as or similar to $x_0$ and $x_1$ described with reference to Equation 19. The base station may output an third sequence by performing the element-wise exclusive-OR operation between the generated first and second sequences (S1120). In an exemplary embodiment of the exclusive-OR operation, when two elements in the same positions of the first sequence and the second sequence are (0 and 1) or (1 and 0), the corresponding element of the third sequence may be defined as 1, and when they are (0 and 0) or (1 and 1), the corresponding element of the third sequence may be defined as 0.

The base station may generate the SSS sequence by performing the operation on the third sequence. In this process, a BPSK operation for the third sequence may be performed. In an exemplary embodiment of the BPSK operation, when the value of the element of the third sequence is 0, the value of the element of the SSS sequence may be defined as −1, and when the value of the element of the third sequence is 1, the value of the element of the SSS sequence may be defined as 1. Alternatively, when the value of the element of the third sequence is 0, the value of the element of the SSS sequence may be defined as 1, and when the value of the element of the third sequence is 1, the value of the element of the SSS sequence may be defined as −1.

The base station may map the generated SSS sequence to a slot according to a frequency (S1130). In an exemplary embodiment of the present disclosure, the mapping of the SSS sequence may be performed in ascending or descending order on the frequency domain. The base station may transmit the SSS to the terminal (S1140). The terminal may receive the SSS transmitted from the base station (S1140). The terminal may decode the received SSS sequence (S1150), and perform a physical cell ID (PCI) estimation operation therefrom (S1160).

In the wireless communication system to which the SSS according to the exemplary embodiments of the present disclosure is applied, the complexity of the operation for generating the SSS may be lower than that of the conventional communication system. This difference may be as shown in Table 2.

TABLE 2

|  | Number of operations for sequence generation | Number of operations for BPSK modulation | Number of multiplication operations |
| --- | --- | --- | --- |
| LTE | 6 | 6 | 6 |
| NR | 2 | 8 | 4 |
| AR | 2 | 4 | 0 |

In addition, in the wireless communication system to which the SSS according to the exemplary embodiments of the present disclosure is applied, unlike the conventional LTE communication system, a collision probability due to interferences from an adjacent cell may be 0%. For example, it may be the same as the experimental results shown in Table 3.

TABLE 3

|  | Single collision probability | Double collision probability |
| --- | --- | --- |
| LTE | 2.48% | 0% |
| NR | 0% | 0% |
| AR | 0% | 0% |

Figure 12:
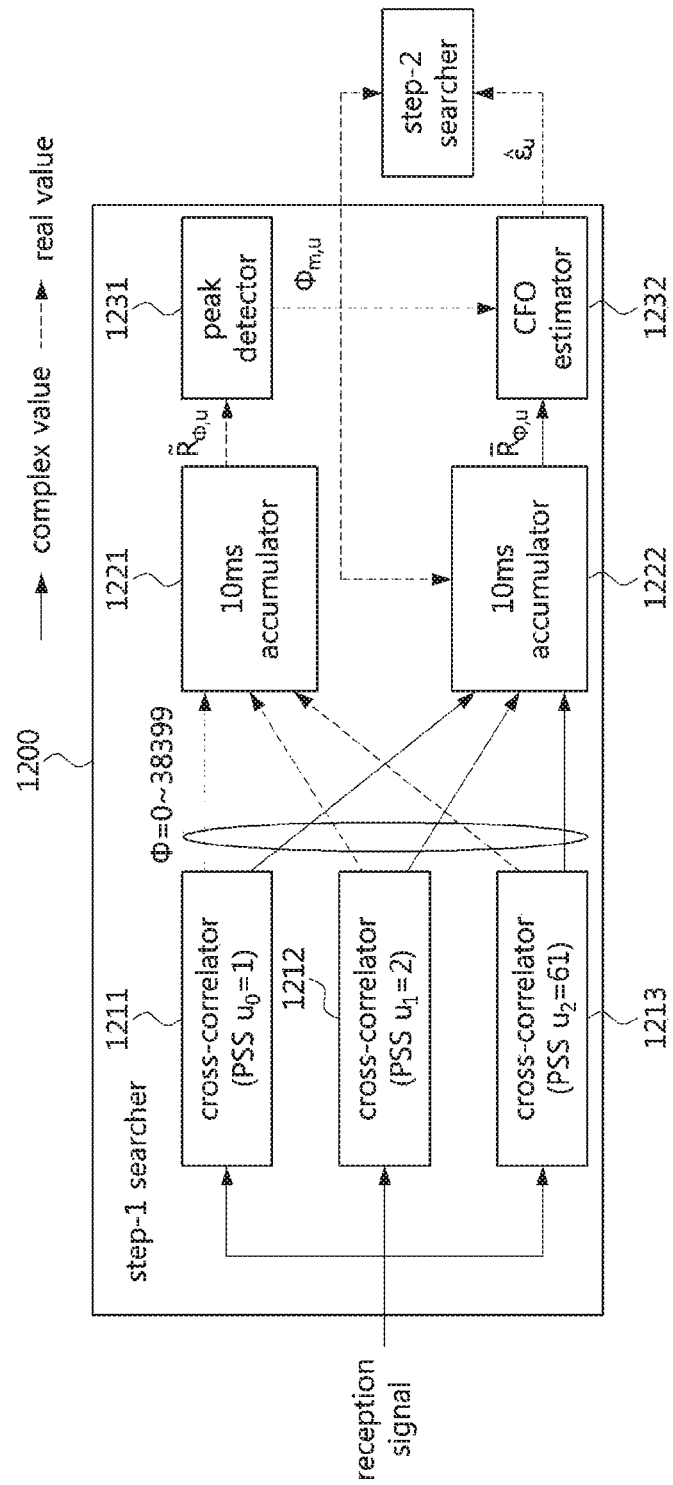
FIG. 12 is a block diagram for explaining an exemplary embodiment of a step-1 cell searcher according to the present disclosure.
Figure 13:
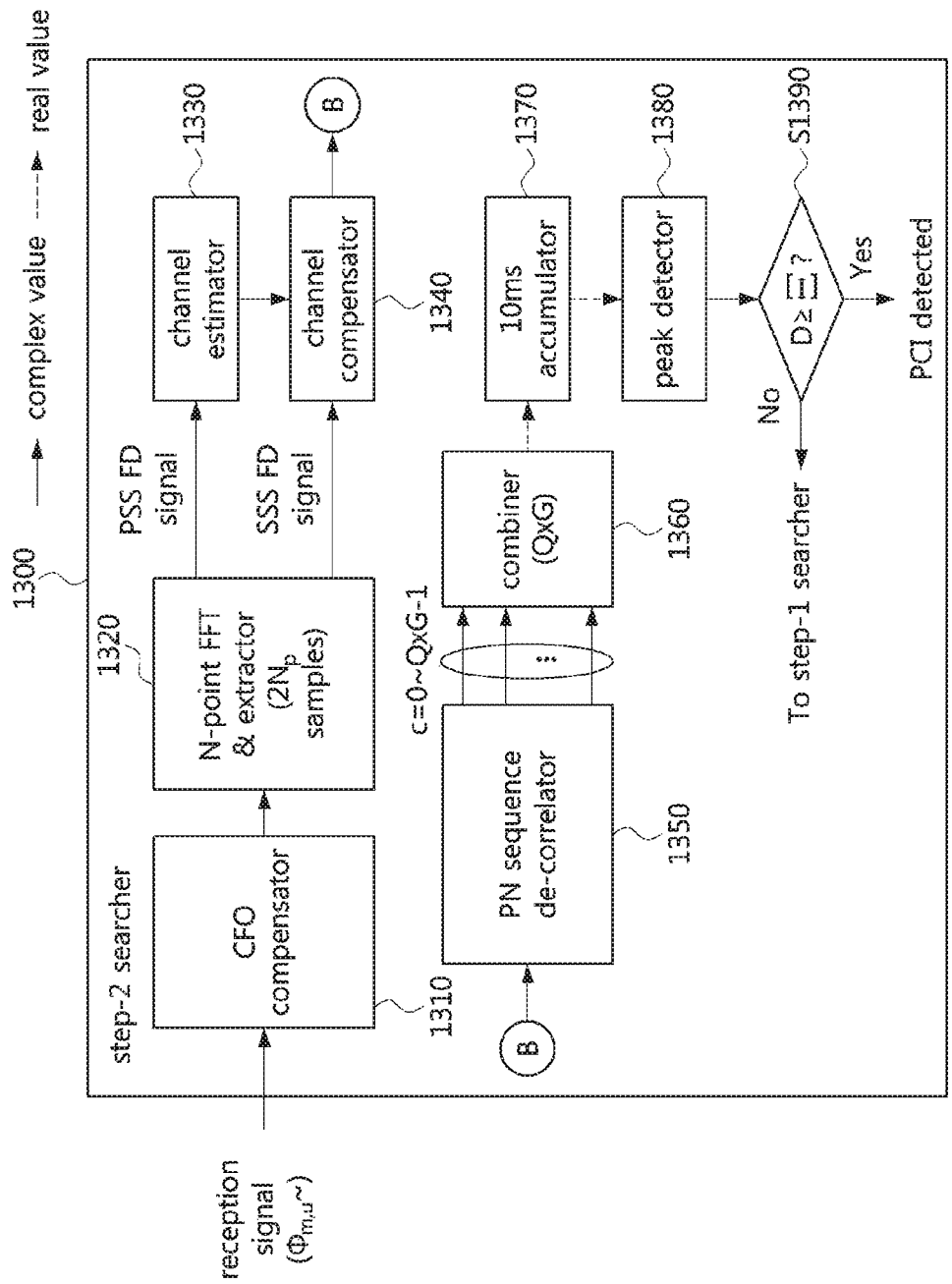
FIG. 13 is a block diagram for explaining an exemplary embodiment of a step-2 cell searcher according to the present disclosure.

FIG. 12 is a block diagram for explaining an exemplary embodiment of a step-1 cell searcher according to the present disclosure, and FIG. 13 is a block diagram for explaining an exemplary embodiment of a step-2 cell searcher according to the present disclosure.

In an exemplary embodiment of the present disclosure, the terminal of the communication system may perform cell search by receiving the synchronization signal transmitted from the base station. The cell search process may be performed through a step-1 searcher and a step-2 searcher, Referring to FIG. 12, a step-1 cell searcher 1200 according to an exemplary embodiment of the present disclosure may include a plurality of cross-correlators 1211, 1212, and 1213, a plurality of accumulators 1221 and 1222, a peak detector 1232, and a CFO estimator 1232. The plurality of cross-correlators 1211, 1212, and 1213 may receive the PSS signal received by the base station. The first cross-correlator 1211 may perform cross-correlation on a PSS sequence index $\mu_0$. The second cross-correlator 1212 may perform cross-correlation on a PSS sequence index $\mu_1$. The third cross-correlator 1213 may perform cross-correlation on a PSS sequence index $\mu_2$. As described with reference to FIG. 10, in an exemplary embodiment of the present disclosure, $\mu_0$, $\mu_1$, and $\mu_2$ may be set to 1, 2, and 61, respectively. However, exemplary embodiments of the present disclosure are not limited thereto. The plurality of cross-correlators 1211, 1212, and 1213 may perform cross-correlation based on the same or similar equation to Equation 18. The plurality of cross-correlators 1211, 1212, and 1213 may output real and complex values as results of the cross-correlation. The real values output from the plurality of cross-correlators 1211, 1212, and 1213 may be transferred to the first accumulator 1221. The complex values output from the plurality of cross-correlators 1211, 1212, and 1213 may be transferred to the second accumulator 1222. The first and second accumulators 1221 and 1222 may accumulate signals received during a first configuration time to output an accumulative correlation value. FIG. 12 shows an example in which the first configuration time is 10 ms. However, exemplary embodiments of the present disclosure are not limited thereto. For example, the first configuration time may be set to 20 ms or other time intervals.

The first accumulator 1221 may accumulate the signals received during the first configuration time to output a first cumulative correlation value $\tilde{R}_{\phi,u}$. The first accumulator 1221 may transmit the output first accumulative correlation value $\tilde{R}_{\phi,u}$ to the peak detector 1231. The peak detector 1231 may estimate the first accumulative correlation value $\tilde{R}_{\phi,u}$ and a sample time offset (STO) $\phi_{m,u}$ at which the first accumulative correlation value $\tilde{R}_{\phi,u}$ becomes maximum for each PSS sequence index. The second accumulator 1222 may accumulate the signals received during the first configuration time to output a second accumulative correlation value $\overline{R}_{\phi,u}$. The CFO estimator 1232 may receive the STO $\phi_{m,u}$ estimated by the peak detector 1231, and receive the second accumulative correlation value $\overline{R}_{\phi,u}$ from the second accumulator 1222. The CFO estimator 1232 may estimate the CFO $\varepsilon_u$ for each PID based on the received values. The CFO estimator 1232 may transfer the estimated STO $\phi_{m,u}$ and CFO $\varepsilon_u$ to the step-2 cell searcher.

Referring to FIG. 13, a step-2 cell searcher 1300 according to an exemplary embodiment of the present disclosure may include a CFO compensator 1310, an extractor 1320, a channel estimator 1330, a channel compensator 1340, a PN sequence de-correlator 1350, a combiner 1360, a third accumulator 1370, and a peak detector 1380.

As described with reference to FIG. 12, the step-2 cell searcher 1300 may receive the estimated STO $\varepsilon_{m,u}$ and CFO for each PID from the step-1 cell searcher 1200. The CFO compensator 1310 may perform CFO compensation by the estimated CFO $\varepsilon_u$ for the received signal based on the estimated STO $\varphi_{m,u}$. The extractor 1320 may perform an N-point FFT, and extract the PSS signal and the SSS signal carried on $2N_p$ subcarriers in the frequency domain, respectively. The channel estimator 1330 may perform channel estimation based on the extracted PSS signal. The channel compensator 1340 may perform channel compensation on the adjacent frequency domain SSS signal based on channel estimation information for each subcarrier. The PN sequence de-correlator 1350 and the combiner 1360 may perform de-correlation and combining on all possible PCI indices. The third accumulator 1370 may accumulate signals received during a second configuration time, and output a final accumulative correlation value for each of all the possible PCI indices. FIG. 13 shows an example in which the second configuration time is 10 ms. However, exemplary embodiments of the present disclosure are not limited thereto. For example, the second configuration time may be set to 20 ms or other time intervals.

The peak detector 1380 may compare the outputted final accumulative correlation value with a threshold D (S1390). When the output final accumulative correlation value is greater than or equal to the threshold D, the peak detector 1380 may determine that the final accumulative correlation value at that time is a PCI of the estimated serving cell. On the other hand, when the outputted final cumulated correlation value is smaller than the threshold D, the cell search through the step-1 and the step-2 cell searchers may be performed again.

Figure 14:
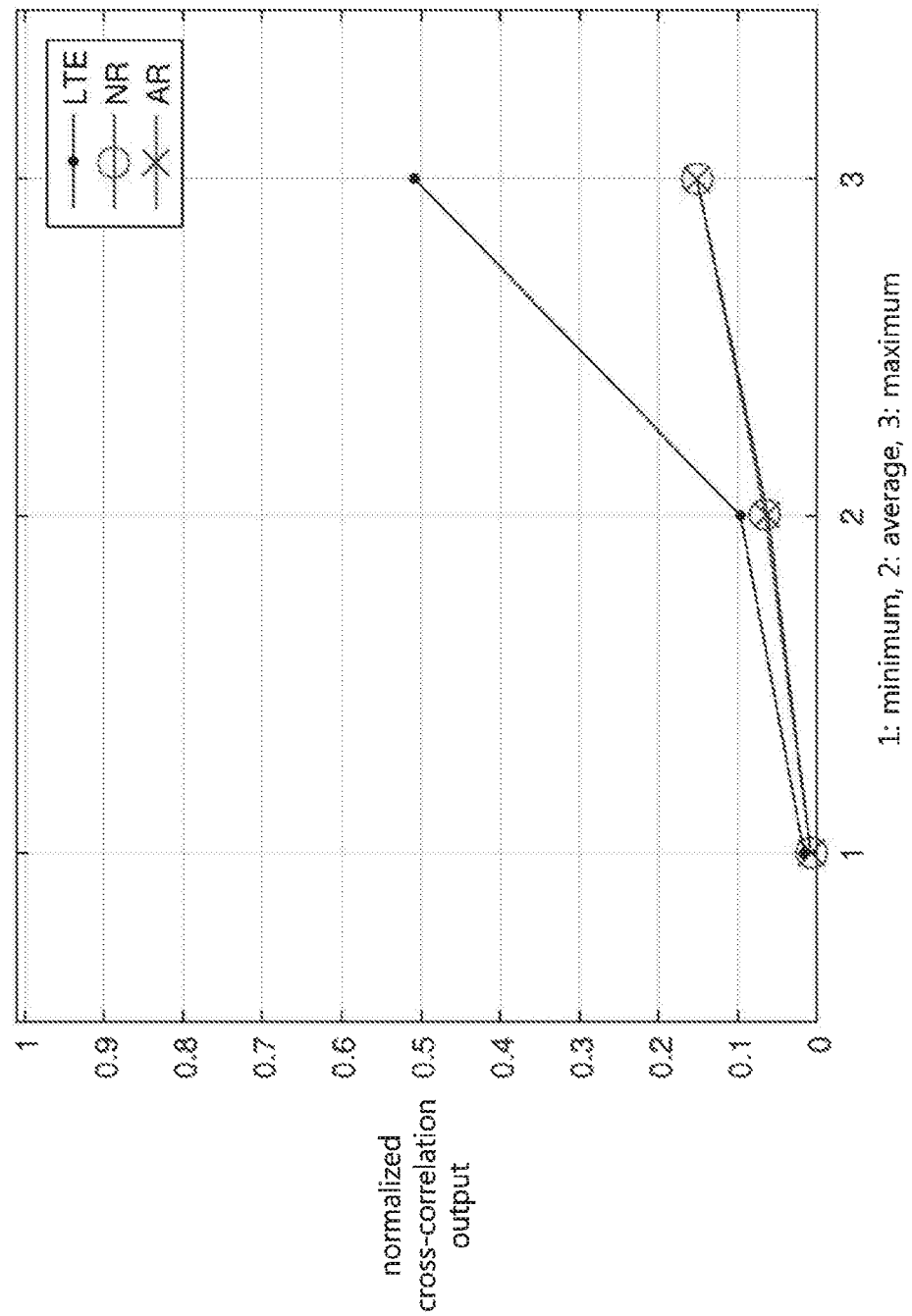
FIG. 14 is an experimental graph for explaining a technical effect of a communication system according to the present disclosure.
Figure 15:
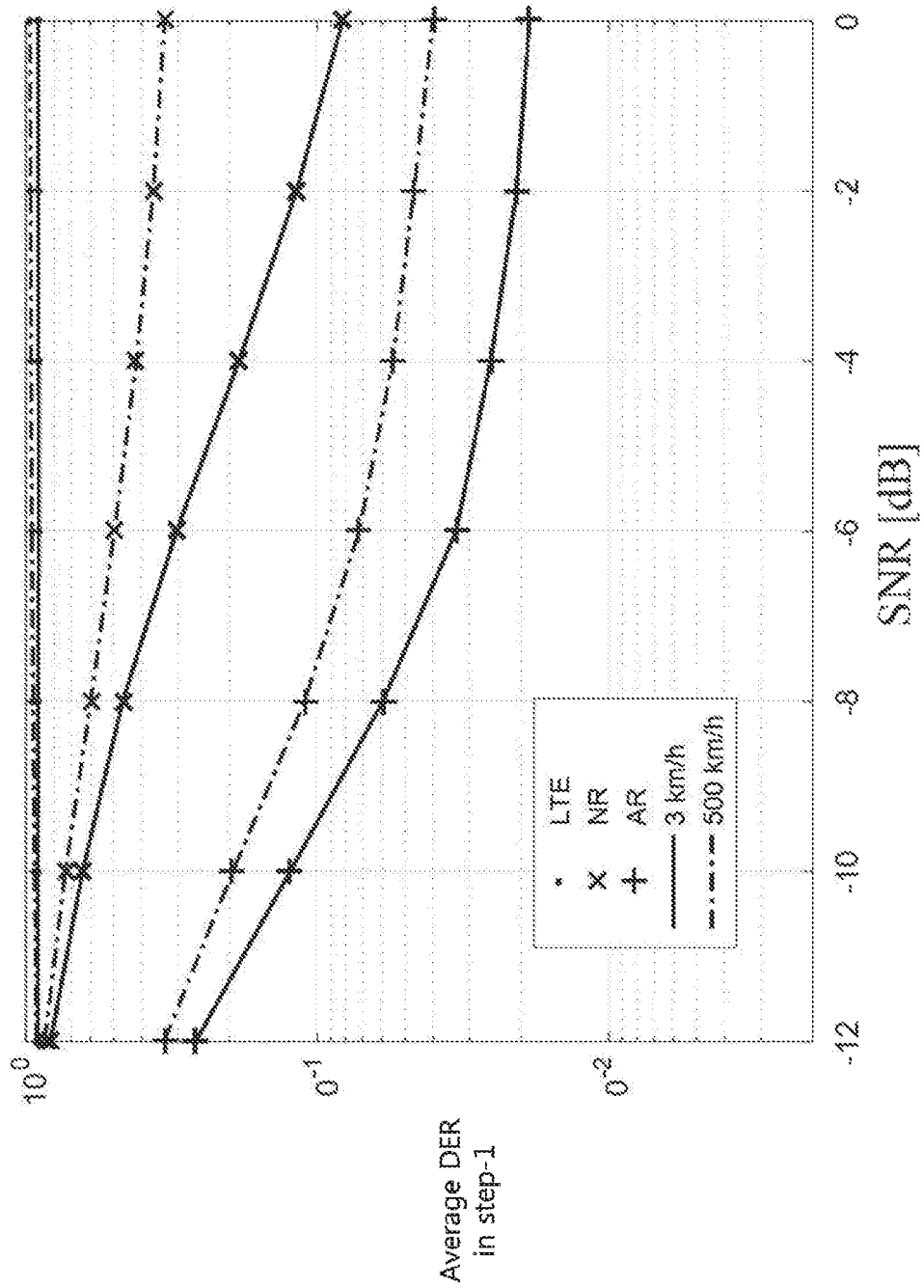
FIG. 15 is an experimental graph for explaining a technical effect of a step-1 cell searcher according to the present disclosure.
Figure 16:
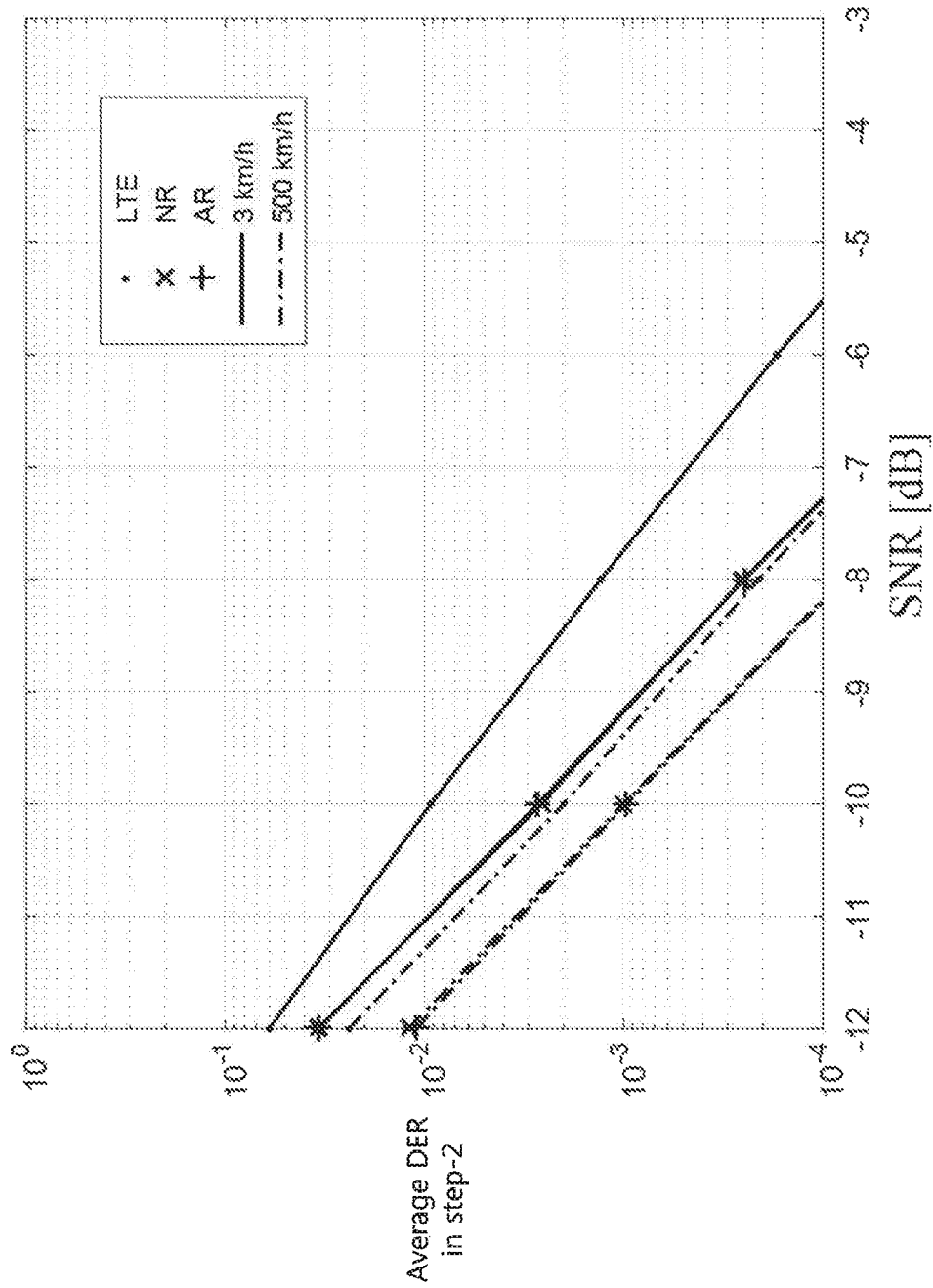
FIG. 16 is an experimental graph for explaining a technical effect of a step-2 cell searcher according to the present disclosure.

FIG. 14 is an experimental graph for explaining a technical effect of a communication system according to the present disclosure, FIG. 15 is an experimental graph for explaining a technical effect of a step-1 cell searcher according to the present disclosure, and FIG. 16 is an experimental graph for explaining a technical effect of a step-2 cell searcher according to the present disclosure. In FIGS. 14 to 16, for convenience of description, a wireless communication system using the synchronization signal proposed by the present disclosure is illustrated as an alternative radio (AR) communication system.

Referring to FIG. 14, the wireless communication system to which the synchronization signal according to the exemplary embodiments of the present disclosure is applied may have excellent cross-correlation characteristics compared to the conventional LTE communication system. Referring to FIGS. 15 and 16, the wireless communication system to which the synchronization signal according to the exemplary embodiments of the present invention is applied may have superior detection error rate (DER) performance compared to the conventional LTE communication system and NR communication system.

In particular, it may have superior DER performance compared to the conventional communication systems even in a situation of high-speed movement.

According to the above-described exemplary embodiment of the present disclosure, the base station and the terminal of the communication system may be configured to transmit and receive the primary synchronization signal (PSS) including the base sequence and the modified sequence having polarity inverted from the base sequence and having a centrally symmetric mapping (CSM) relationship with the base sequence, thereby efficiently performing the time/frequency synchronization procedure.

According to the exemplary embodiments of the present disclosure, the base station and the terminal of the communication system may transmit and receive the secondary synchronization signal (SSS) defined based on an exclusive-OR operation between two different binary pseudo-noise (PN) sequences, thereby efficiently performing the physical cell ID (PCI) estimation procedure even in the presence of the frequency offset.

In the present disclosure, for convenience of description, the case in which the base station generates the synchronization signal and transmits it to the terminal, and the terminal receives the synchronization signal and performs cell search has been described as an example, but exemplary embodiments of the present disclosure are not limited thereto. For example, the generation and transmission/reception operation of the synchronization in the present disclosure described above may be performed by terminals performing sidelink (SL) communications therebetween.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of transmitting a synchronization signal, performed by a base station in a communication system, the method comprising:
    generating a base sequence;
    generating a modified sequence by inverting polarity of the base sequence;
    mapping the base sequence and the modified sequence to a first frequency region having a frequency higher than a center subcarrier and a second frequency region having a frequency lower the center subcarrier, so that element indices of the base sequence and element indices of the modified sequence are symmetric centering the center subcarrier located at a center frequency of a frequency domain of the synchronization signal; and
    transmitting the synchronization signal comprising the base sequence and the modified sequence to a terminal.

2. The method according to claim 1, wherein the base sequence is a complex sequence, and in the generating of the modified sequence, the modified sequence is generated by inverting polarity of at least one of real parts and imaginary parts of the base sequence.

3. The method according to claim 1, wherein the base sequence is a binary sequence, and in the generating of the modified sequence, the modified sequence is generated by inverting polarity of real parts of the base sequence.

4. The method according to claim 1, wherein the synchronization signal is a primary synchronization signal (PSS), the PSS is generated based on a first optimal sequence set, and the first optimal sequence set is generated by: generating a plurality of candidate sequence sets based on an accumulated auto-correlation value for an effective time synchronization range for each of a plurality of sequences constituting the base sequence, and selecting the first optimal sequence set based on an effective cross-correlation value between sequences constituting each of the candidate sequence sets among the plurality of candidate sequence sets.

5. A method of transmitting a synchronization signal, performed by a base station in a communication system, the method comprising:
    generating a first sequence and a second sequence which are binary sequences different from each other;
    generating a third sequence by performing an element-wise exclusive-OR operation between the first sequence and the second sequence;
    generating a synchronization signal by performing a binary phase shift keying (BPSK) modulation once on the third sequence generated by performing the element-wise exclusive-OR operation between the first sequence and the second sequence;
    mapping the generated synchronization signal to a frequency domain; and
    transmitting the generated synchronization signal to a terminal.

6. The method according to claim 5, wherein the generating of the first sequence and the second sequence comprises:
    generating a first binary sequence and a second binary sequence which are different from each other;
    generating the first sequence by applying a first shift index to the first binary sequence; and
    generating the second sequence by applying a second shift index to the second binary sequence.

7. The method according to claim 6, wherein a first scaling factor and a second scaling factor, which are different from each other, are applied to the first shift index and the second shift index, respectively.

8. The method according to claim 6, wherein the synchronization signal is a secondary synchronization signal (SSS), and the first and second shift indices are generated based on a physical cell ID (PCI) index of the base station.

9. The method according to claim 5, wherein the generating of the third sequence comprises:
    setting a value at an n-th position of the third sequence to 1 when a value at the n-th position of the first sequence is different from a value at the n-th position of the second sequence; and
    setting the value at the n-th position of the third sequence to 0 when the value at the n-th position of the first sequence is equal to the value at the n-th position of the second sequence.

10. The method according to claim 5, wherein generating the synchronization signal by performing the BPSK modulation comprises:
    setting a value at an n-th position of the synchronization signal based on the third sequence to a first setting value when a value at the n-th position of the third sequence is 0; and
    setting the value at the n-th position of the synchronization signal based on the third sequence to a second setting value when the value at the n-th position of the third sequence is 1,
    wherein the second setting value is set to −1 when the first setting value is set to 1, and the second setting value is set to 1 when the first setting value is set to −1.

11. A base station for transmitting a first synchronization signal and a second synchronization signal, for synchronization estimation at a terminal, to the terminal in a communication system, the base station comprising:
    a processor;
    a memory electronically communicating with the processor; and
    instructions stored in the memory,
    wherein when executed by the processor, the instructions cause the base station to:
        generate a base sequence for generation of the first synchronization signal;
        generate a modified sequence by inverting polarity of the base sequence;
        map the base sequence and the modified sequence to a first frequency region having a frequency higher than a center subcarrier and a second frequency region having a frequency lower the center subcarrier, so that the base sequence and the modified sequence are symmetric centering the center subcarrier located at a center frequency of a frequency domain of the first synchronization signal;

generate a first sequence and a second sequence, which are different from each other, for generation of the second synchronization signal;

generate a third sequence by performing an element-wise exclusive-OR operation between the first sequence and the second sequence;

generate the second synchronization signal based on the third sequence; and transmit the first and second synchronization signals to the terminal.

12. The base station according to claim 11, wherein the base sequence is a complex sequence, and the instructions cause the base station to generate the modified sequence by inverting polarity of at least one of real parts and imaginary parts of the base sequence.

13. The base station according to claim 11, wherein the base sequence is a binary sequence, and the instructions cause the base station to generate the modified sequence by inverting polarity of real parts of the base sequence.

14. The base station according to claim 11, wherein the first synchronization signal is a primary synchronization signal (PSS) for a time/frequency synchronization (TFS) estimation at the terminal, the PSS is generated based on a first optimal sequence set, and the first optimal sequence set is selected based on an effective cross-correlation value between sequences constituting each of a plurality of candidate sequence sets generated based on an accumulated auto-correlation value for an effective time synchronization range for each of a plurality of sequences constituting the base sequence.

15. The base station according to claim 11, wherein the instructions cause the base station to:

generate a first binary sequence and a second binary sequence which are different from each other;

generate the first sequence by applying a first shift index to the first binary sequence; and generate the second sequence by applying a second shift index to the second binary sequence.

16. The base station according to claim 15, wherein a first scaling factor and a second scaling factor, which are different from each other, are applied to the first shift index and the second shift index, respectively.

17. The base station according to claim 15, wherein the second synchronization signal is a secondary synchronization signal (SSS) for a physical cell ID (PCI) estimation at the terminal, and the first and second shift indices are generated based on a PCI index of the base station.

18. The base station according to claim 11, wherein the instructions further cause the base station to:

set a value at an n-th position of the third sequence to 1 when a value at the n-th position of the first sequence is different from a value at the n-th position of the second sequence; and set the value at the n-th position of the third sequence to 0 when the value at the n-th position of the first sequence is equal to the value at the n-th position of the second sequence.

19. The base station according to claim 11, wherein the instructions further cause the base station to:

set a value at an n-th position of the synchronization signal based on the third sequence to a first setting value when a value at the n-th position of the third sequence is 0; and set the value at the n-th position of the synchronization signal based on the third sequence to a second setting value when the value at the n-th position of the third sequence is 1, wherein the second setting value is set to −1 when the first setting value is set to 1, and the second setting value is set to 1 when the first setting value is set to −1.

* * * * *